United States Patent
Kawasaki

(10) Patent No.: US 9,112,955 B2
(45) Date of Patent: Aug. 18, 2015

(54) MOBILE TERMINAL DEVICE

(75) Inventor: Yasuhiko Kawasaki, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/236,532

(22) PCT Filed: Jul. 10, 2012

(86) PCT No.: PCT/JP2012/067567
§ 371 (c)(1),
(2), (4) Date: Jan. 31, 2014

(87) PCT Pub. No.: WO2013/031386
PCT Pub. Date: Mar. 7, 2013

(65) Prior Publication Data
US 2014/0213325 A1    Jul. 31, 2014

(30) Foreign Application Priority Data

Aug. 29, 2011    (JP) .................................. 2011-185927

(51) Int. Cl.
*H04M 1/04* (2006.01)
*H04M 1/02* (2006.01)
*G06F 1/16* (2006.01)

(52) U.S. Cl.
CPC ........... *H04M 1/0216* (2013.01); *G06F 1/1616* (2013.01); *H04M 1/0222* (2013.01);
(Continued)

(58) Field of Classification Search
CPC ........ H04M 1/04; H04M 1/05; H04M 1/7253
USPC .......... 455/575.3, 575.1, 347, 128, 566, 90.3; 379/330, 302
See application file for complete search history.

(56) References Cited

U.S. PATENT DOCUMENTS 3,879,573 A * 4/1975 Ehrlich ............................ 174/46
6,079,993 A * 6/2000 Laine ............................. 439/165
(Continued)

FOREIGN PATENT DOCUMENTS

| JP | 05-061423 A | 3/1993 |
| JP | 06-083779 A | 3/1994 |

(Continued)

OTHER PUBLICATIONS

International Search Report corresponding to International Application No. PCT/JP2012/067567, Jul. 27, 2012, 5 pages.

(Continued)

*Primary Examiner* — Minh D Dao
(74) *Attorney, Agent, or Firm* — Wilmer Cutler Pickering Hale and Dorr LLP

(57) ABSTRACT

The mobile terminal device of the present invention includes at least one hinge and a first enclosure and second enclosure that are openably/closably connected by way of the hinge. The distances between the center of the hinge and the non-opposing surface of each of the first enclosure and second enclosure are equal. When the first and second enclosures in a closed state are rotated by the angle formed by the two normal lines drawn from the center of the hinge to the non-opposing surface of each of the first enclosure and second enclosure, the portions at which the non-opposing surfaces intersect the hinge-side side surfaces of the first enclosure and second enclosure match. The diameter of the hinge is equal to or less than the total length of the distances between the center of the hinge and the non-opposing surface of each of the first enclosure and second enclosure.

8 Claims, 27 Drawing Sheets

(52) U.S. Cl.
 CPC ........... *H04M1/0247* (2013.01); *H04M 1/0266* (2013.01); *H04M 2250/16* (2013.01); *H04M 2250/22* (2013.01)

(56) References Cited

U.S. PATENT DOCUMENTS

| | | | |
|---|---|---|---|
| 6,700,784 B2* | 3/2004 | Huang et al. | 361/715 |
| 6,766,181 B1* | 7/2004 | Newman et al. | 455/575.3 |
| 6,922,573 B2* | 7/2005 | Hijii | 455/575.3 |
| 7,017,513 B2* | 3/2006 | Giewercer | 116/308 |
| 7,034,755 B2* | 4/2006 | Takagi | 343/702 |
| 7,199,313 B1* | 4/2007 | Kemppinen | 200/5 A |
| 7,209,084 B2* | 4/2007 | Lindell | 343/702 |
| 7,483,723 B2* | 1/2009 | Soderlund | 455/575.1 |
| 7,546,152 B2* | 6/2009 | Christensen | 455/575.3 |
| 7,667,959 B2* | 2/2010 | Pelkonen | 361/679.27 |
| 8,472,175 B2* | 6/2013 | Yang et al. | 361/679.27 |
| 2001/0016508 A1* | 8/2001 | Kido et al. | 455/575 |
| 2001/0036845 A1* | 11/2001 | Park | 455/566 |
| 2002/0142736 A1* | 10/2002 | Shin | 455/90 |
| 2007/0103382 A1 | 5/2007 | Chang et al. | |
| 2009/0300882 A1* | 12/2009 | Hayashi | 16/303 |
| 2010/0302179 A1 | 12/2010 | Ahn et al. | |
| 2010/0328860 A1 | 12/2010 | Kim et al. | |
| 2011/0102302 A1 | 5/2011 | Watanabe et al. | |
| 2013/0109447 A1* | 5/2013 | Sakamoto et al. | 455/575.1 |
| 2015/0011272 A1* | 1/2015 | Lumbard | 455/575.3 |

FOREIGN PATENT DOCUMENTS

| | | |
|---|---|---|
| JP | 06-231206 A | 8/1994 |
| JP | 2002-098941 A | 4/2002 |
| JP | 2002-314657 A | 10/2002 |
| JP | 2004-198472 A | 7/2004 |
| JP | 2007-512759 A | 5/2007 |
| JP | 2009-260593 A | 11/2009 |
| KR | 10-0460299 B1 | 11/2004 |
| WO | WO-2005/055454 A1 | 6/2005 |

OTHER PUBLICATIONS

Extended European Search Report corresponding to European Application No. 12827210.1, dated Apr. 7, 2015, 7 pages.

* cited by examiner

MOBILE TERMINAL DEVICE

CROSS-REFERENCE TO RELATED APPLICATIONS

This application is a national stage application of International Application No. PCT/JP2012/067567 entitled "Mobile Terminal Device," filed on Jul. 10, 2012, which claims the benefit of the priority of Japanese Patent Application No. 2011-185927, filed on Aug. 29, 2011, the disclosures of each of which are hereby incorporated by reference in their entirety.

TECHNICAL FIELD

The present invention relates to a mobile terminal device such as a portable telephone, PHS (Personal Handyphone System), PDA (Personal Data Assistance, Personal Digital Assistant (personal portable information communication apparatus)), and more particularly relates to a mobile terminal device having a construction in which a plurality of enclosures are openably/closably connected by means of a hinge part.

BACKGROUND ART

In mobile terminal devices, the demand for miniaturization that is convenient for mobility has resulted in an increase in mobile terminal devices that have a construction in which two enclosures are openably/closably connected by means of a hinge part.

However, contrary to the above-described demand for miniaturization, there is also a demand for larger screens that accompanies the increase in functions installed in mobile terminal devices.

In response to these demands, Patent Document 1 discloses a mobile terminal device that forms a display unit on the same plane as the two enclosures when the enclosures are opened.

However, in the mobile terminal device described in Patent Document 1, the hinge part forms a protrusion when the enclosures are opened. This protrusion not only detracts from the design but also, depending on the angle, detracts from the visibility of the screen.

In addition, a mobile terminal device that has a folding construction may have a gap or a difference in levels when the enclosures are opened.

LITERATURE OF THE PRIOR ART

Patent Documents

Patent Document 1: Japanese Unexamined Patent Application Publication No. 2002-098941

SUMMARY OF THE INVENTION

Problem to be Solved by the Invention

As described hereinabove, in relevant mobile terminal devices, there has been the problem in which the hinge part forms a protrusion or in which a gap or a difference in level occurs between enclosures when the enclosures are opened.

It is therefore an object of the present invention to provide a mobile terminal device that can provide a solution to the above-described problem.

Means for Solving the Problem

The mobile terminal device of the present invention includes:

at least one hinge part; and
a first enclosure and second enclosure that are openably and closably connected by way of the hinge part;
wherein:
when, in the first enclosure and second enclosure, surfaces that face the other enclosure in the closed state are opposing surfaces and surfaces that are on the reverse sides of the opposing surfaces are non-opposing surfaces;
the distances between the center of the hinge part and the non-opposing surfaces of each of the first enclosure and the second enclosure are equal;
when the first enclosure and the second enclosure that are in the closed state are rotated by the angle formed by the two normal lines drawn from the center of the hinge part to the non-opposing surface of each of the first enclosure and the second enclosure, the portion at which the non-opposing surface of said first enclosure intersects with the hinge-side side surface matches the portion at which the non-opposing surface of said second enclosure intersects the hinge-side side surface; and
the diameter of the hinge part is equal to or less than the total length of the distances between the center of the hinge part and the non-opposing surface of each of the first enclosure and the second enclosure.

Effect of the Invention

According to the present invention, an effect is obtained in which, when the first enclosure and the second enclosure are opened, a surface that is free of a protrusion, a difference in level, or a gap can be formed on the non-opposing surface sides of the first enclosure and the second enclosure.

MODE FOR CARRYING OUT THE INVENTION

Modes for carrying out the present invention are next described with reference to the accompanying drawings.

(1) First Exemplary Embodiment

Figure 1:
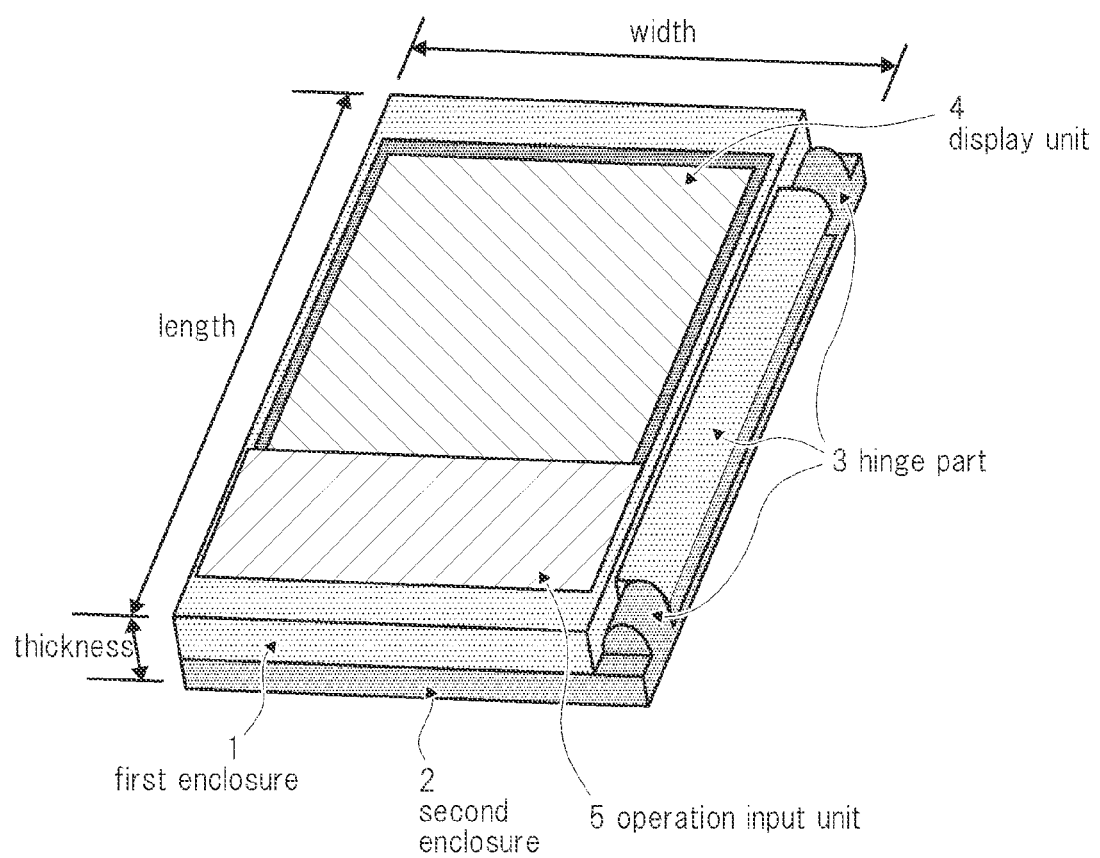
FIG. 1 is a perspective view of the state in which the enclosures of the mobile terminal device of the first exemplary embodiment of the present invention are closed.
Figure 2:
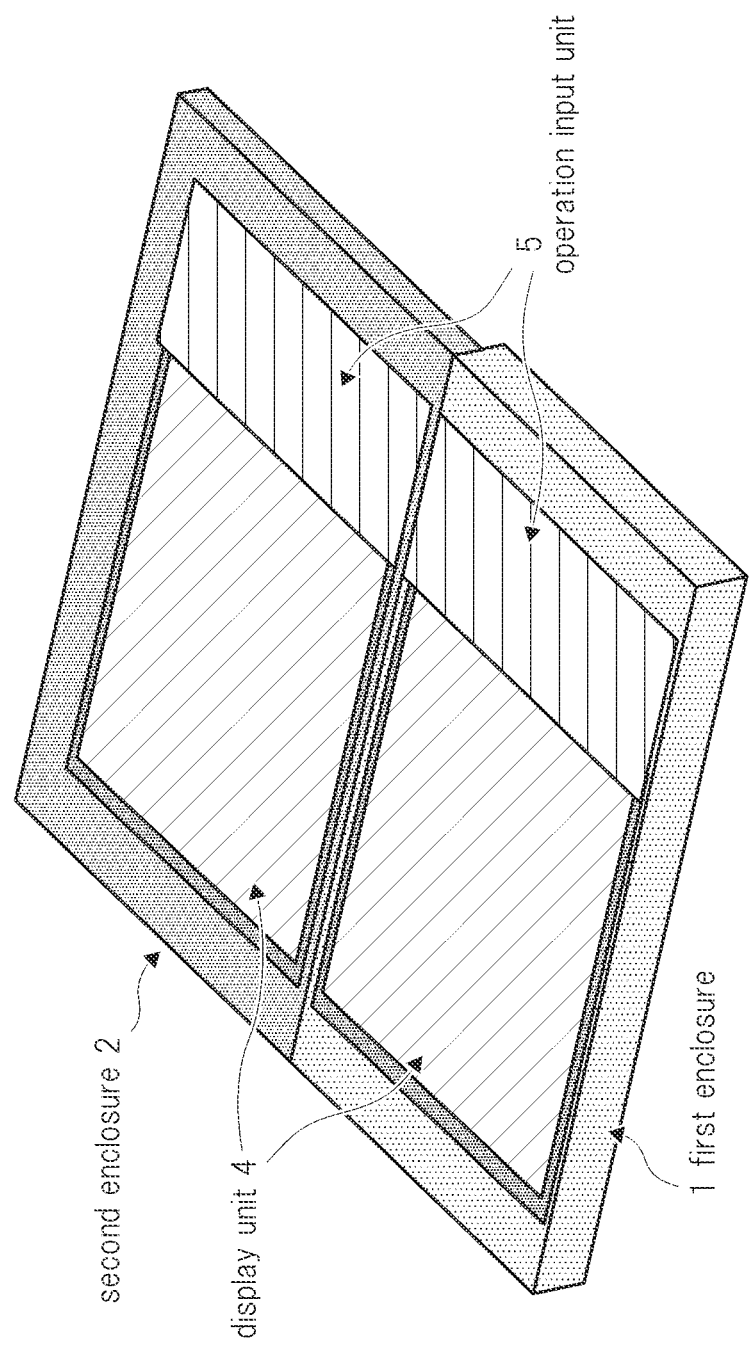
FIG. 2 is a perspective view of the state in which the enclosures of the mobile terminal device of the first exemplary embodiment of the present invention are opened.

FIG. 1 and FIG. 2 are perspective views of the mobile terminal device of the first exemplary embodiment of the present invention.

As shown in FIG. 1 and FIG. 2, the mobile terminal device of the present exemplary embodiment includes first enclosure 1, second enclosure 2, and hinge part 3.

The axial direction of the axis of opening and closing of hinge part 3 is hereinbelow referred to as the length direction, the direction that is orthogonal to the length direction is hereinbelow referred to as the width direction, and the direction of thickness of the mobile terminal device is referred to as the thickness direction.

Hinge part 3 connects first enclosure 1 and second enclosure 2 so as to allow opening and closing. Hinge part 3 actually accommodates mechanical parts for maintaining the opened and closed states of first enclosure 1 and second enclosure 2, but explanation regarding these parts is here omitted.

First enclosure 1 and second enclosure 2 perform a circular movement with the axis of opening and closing of hinge part 3 as the center, whereby the opening and closing operations of first enclosure 1 and second enclosure 2 are realized.

FIG. 1 shows the state in which first enclosure 1 and second enclosure 2 are closed, and FIG. 2 shows the state in which first enclosure 1 and second enclosure 2 are opened.

In addition, display unit 4 that is, for example, a liquid crystal display, and operation input unit 5 that is, for example, keys, are arranged at the same positions aligned in the same directions along the length direction on first enclosure 1 and second enclosure 2, whereby display unit 4 and operation input unit 5 are formed continuously in the width direction across first enclosure 1 and second enclosure 2 when first enclosure 1 and second enclosure 2 are opened.

Figure 3:
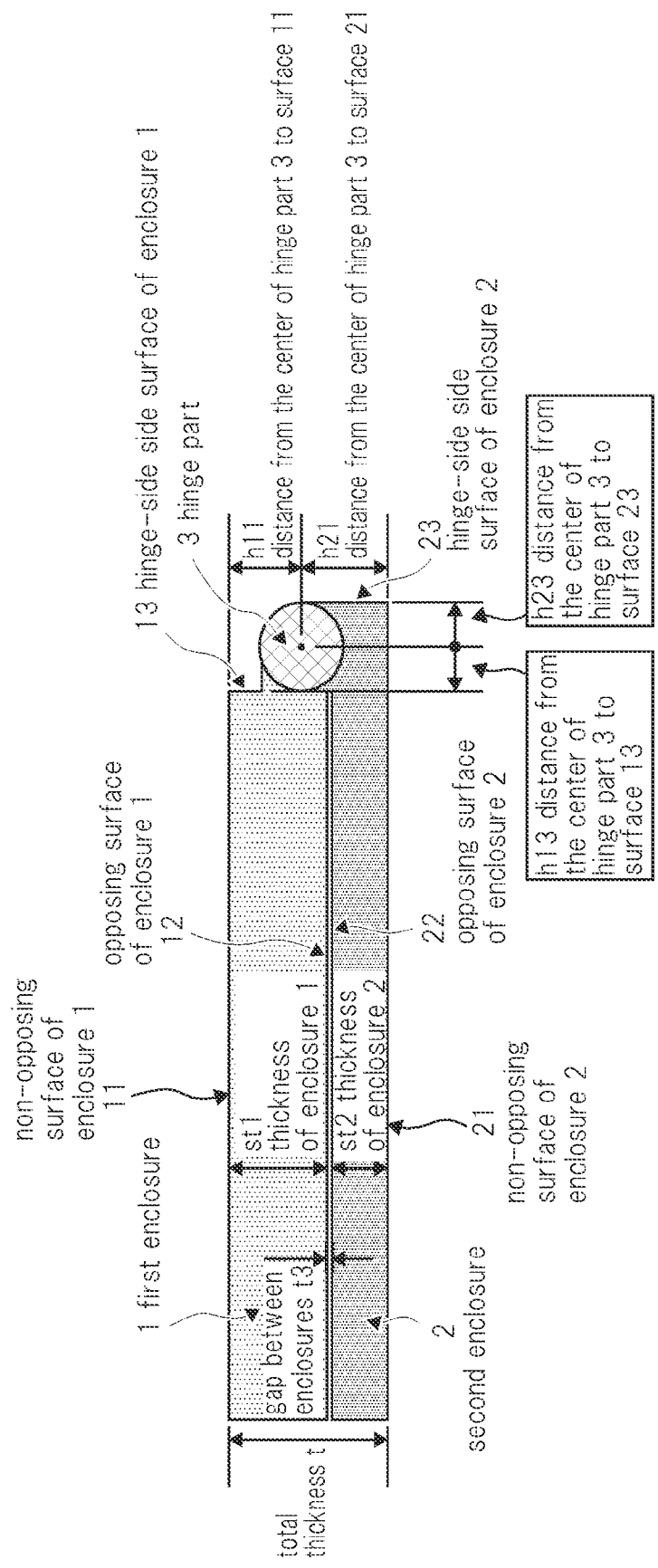
FIG. 3 is a side view of the state in which the enclosures of the mobile terminal device of the first exemplary embodiment of the present invention are closed.
Figure 4:
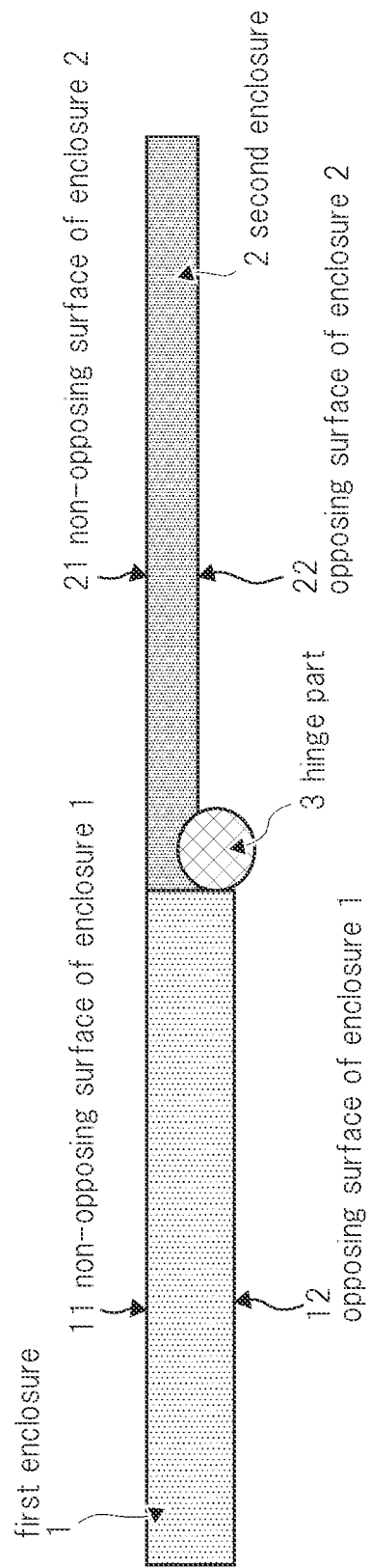
FIG. 4 is a side view of the state in which the enclosures of the mobile terminal device of the first exemplary embodiment of the present invention are opened.

FIG. 3 and FIG. 4 are side views of the mobile terminal device of the present exemplary embodiment.

In the following explanation, surfaces on first enclosure 1 and second enclosure 2 that face the other enclosure in the closed state are referred to as opposing surfaces and surfaces that are on the reverse side of the opposing surfaces are referred to as non-opposing surfaces. In addition, the side surfaces on the side of hinge part 3 are referred to as the hinge-side side surfaces.

Making the thicknesses st1 and st2 (FIG. 3) of first enclosure 1 and second enclosure 2 equal typically poses a limit upon design, often interfering with the free arrangement of parts and detracting from space efficiency. As a result, the thicknesses st1 and st2 of first enclosure 1 and second enclosure 2 are often different.

In addition, making the widths of first enclosure 1 and second enclosure 2 equal also frequently interferes with the free arrangement of components, and the widths of first enclosure 1 and second enclosure 2 may also differ.

The arrangement in any position of hinge part 3 that connects first enclosure 1 and second enclosure 2 that have different sizes as described above gives rise to various problems, such as the problem in which first enclosure 1 and second enclosure 2 do not open, or if opened, in which a gap opens or a difference in level occurs between first enclosure 1 and second enclosure 2.

Figure 5:
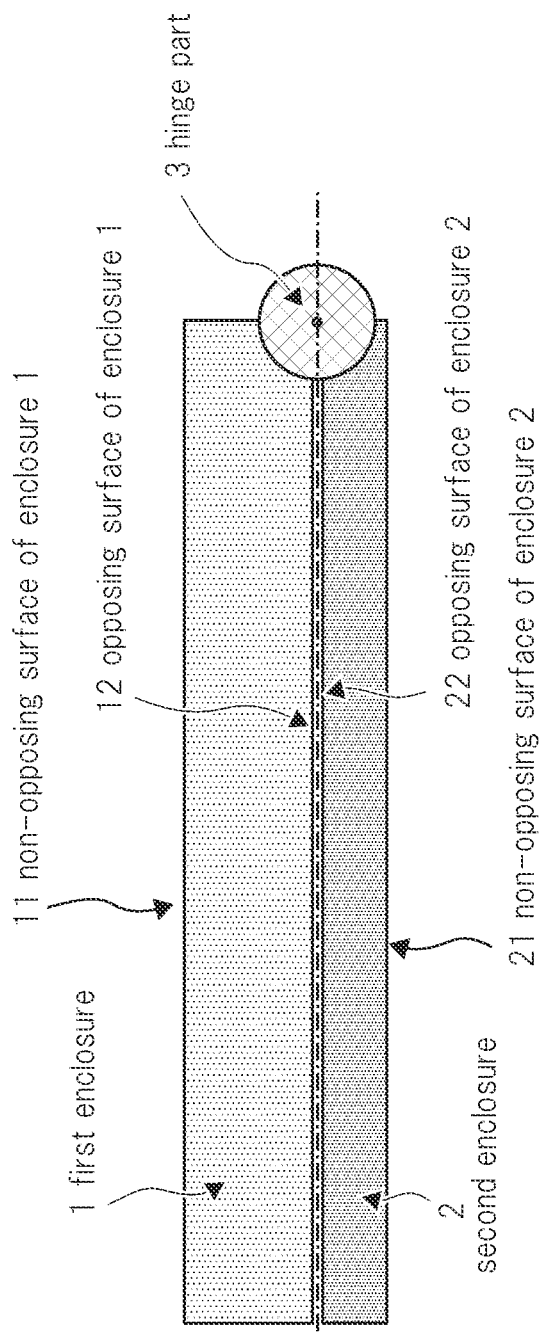
FIG. 5 is a side view of the state in which the enclosures of a related mobile terminal device are closed.
Figure 6:
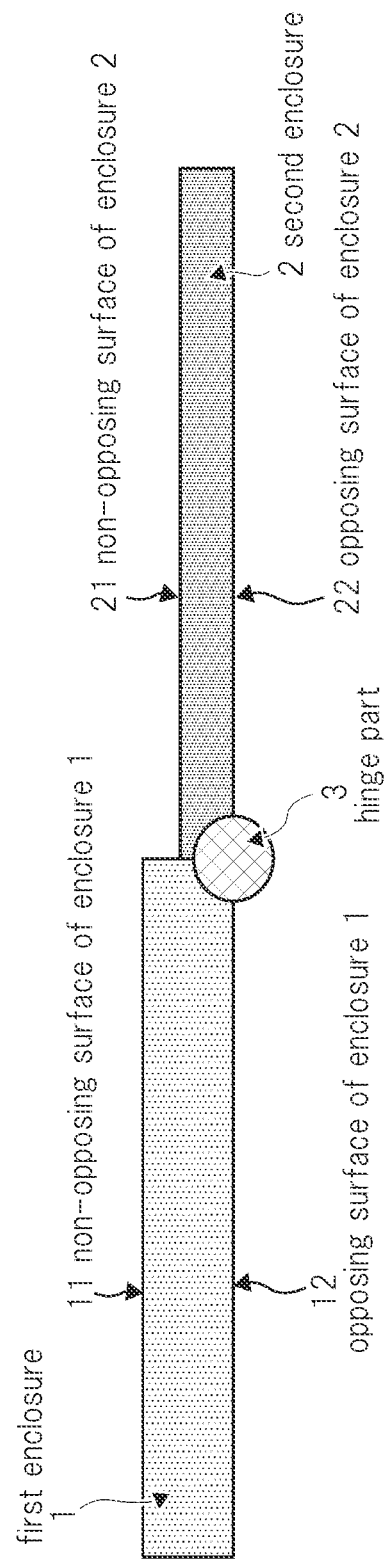
FIG. 6 is a side view of the state in which the enclosures of a related mobile terminal device are opened.

These problems are next described with the construction of FIG. 5 and FIG. 6 as an example.

In the configuration of FIG. 5 and FIG. 6, the distances from the center of hinge part 3 to opposing surfaces 12 and 22 of first enclosure 1 and second enclosure 2, respectively, are equal, as shown in FIG. 5. This configuration is frequently used for enabling equal strength between hinge part 3 and first enclosure 1 and second enclosure 2 and for securing equal space for the passage of connecting wiring between first enclosure 1 and second enclosure 2.

In the case of this configuration, however, hinge part 3 forms a protrusion on the side of opposing surfaces 12 and 22 of first enclosure 1 and second enclosure 2, respectively, when first enclosure 1 and second enclosure 2 are opened as shown in FIG. 6. On the side of non-opposing surfaces 11 and 21 of first enclosure 1 and second enclosure 2, hinge part 3 does not form a protrusion, but a difference in level occurs between first enclosure 1 and second enclosure 2.

In the present exemplary embodiment, in contrast, measures are taken to eliminate the difference in level between first enclosure 1 and second enclosure 2 on the side of non-opposing surfaces 11 and 21 of first enclosure 1 and second enclosure 2. The configuration of the mobile terminal device of the present exemplary embodiment that realizes this object is described using FIG. 3 and FIG. 4.

First, with regard to the thickness direction, as shown in FIG. 3, the distances h11 and h21 from the center of hinge part 3 to non-opposing surfaces 11 and 21 of first enclosure 1 and second enclosure 2, respectively, are made equal. Here, distance h11 from the center of hinge part 3 to non-opposing surface 11 of first enclosure 1 is the length of the normal line drawn from the center of hinge part 3 to non-opposing surface 11 of first enclosure 1, and distance h21 from the center of hinge part 3 to non-opposing surface 21 of second enclosure 2 is the length of the normal line drawn from the center of hinge part 3 to non-opposing surface 21 of second enclosure 2.

By means of this configuration, the occurrence of a difference in level between first enclosure 1 and second enclosure 2 on the side of non-opposing surfaces 11 and 21 when first enclosure 1 and second enclosure 2 are opened can be avoided, as shown in FIG. 4.

Still further, regarding the thickness direction, the diameter of hinge part 3 is made equal to or less than the total thickness t of the mobile terminal device, as shown in FIG. 3. Here, total thickness t refers to the total length of distances h11 and h21 from the center of hinge part 3 to the non-opposing surfaces 11 and 21 of first enclosure 1 and second enclosure 2, respectively. Total thickness t can represent the total length of thickness st1 of first enclosure 1, thickness st2 of second enclosure 2, and gap st3 of the thickness direction between first enclosure 1 and second enclosure 2.

In this way, the protrusion formed by hinge part 3 on the side of non-opposing surfaces 11 and 12 when first enclosure 1 and second enclosure 2 are opened can be avoided, as shown in FIG. 4.

Next, with regard to the width direction, hinge-side side surfaces 13 and 23 of first enclosure 1 and second enclosure 2, respectively, are caused to match when first enclosure 1 and second enclosure 2 in the closed state as shown in FIG. 3 are rotated by a predetermined angle. Here, the matching of hinge-side side surfaces 13 and 23 refers to the contact or proximity of hinge-side side surfaces 13 and 23. In addition, the predetermined angle refers to the angle formed by the two normal lines drawn from the center of hinge part 3 to each of non-opposing surfaces 11 and 21 of first enclosure 1 and second enclosure 2.

In the present exemplary embodiment, because opposing surfaces 12 and 22 and non-opposing surfaces 11 and 21 in both first enclosure 1 and second enclosure 2 are mutually parallel, and moreover, because hinge-side side surfaces 13 and 23 are perpendicular surfaces with respect to opposing surfaces 12 and 22 and non-opposing surfaces 11 and 21, the above-described predetermined angle is 180 degrees.

Still further, in the present exemplary embodiment, if distances h13 and h23 from the center of hinge part 3 to hinge-side side surfaces 13 and 23 of first enclosure 1 and second enclosure 2 are equal, and moreover, if hinge-side side surfaces 13 and 23 are opposite each other in the width direction as seen from the center of hinge part 3, hinge-side side surfaces 13 and 23 will match when first enclosure 1 and second enclosure 2 in the closed state are rotated 180 degrees.

The adoption of this configuration enables first enclosure 1 and second enclosure 2 to be brought into proximity without any gap in the width direction on the side of non-opposing surfaces 11 and 21 when first enclosure 1 and second enclosure 2 are opened, as shown in FIG. 4.

In order to place first enclosure 1 and second enclosure 2 in proximity without a gap and without necessitating absolute matching of hinge-side side surfaces 13 and 23, the portion at which hinge-side side surface 13 intersects non-opposing surface 11 should match the portion at which hinge-side side surface 23 intersects non-opposing surface 21.

By means of the above-described configuration in the present exemplary embodiment, a surface can be formed that is free of a protrusion, a difference in levels, or a gap on the side of non-opposing surfaces 11 and 21 when first enclosure 1 and second enclosure 2 are opened, as shown in FIG. 4.

Accordingly, the user is able to close first enclosure 1 and second enclosure 2 and carry the device compactly when carrying the device, and when using the device, is able to place first enclosure 1 and second enclosure 2 in the opened state and use a surface that is free of any protrusion, difference in levels, or gap.

For example, in the case of the arrangement of FIG. 1 and FIG. 2, when first enclosure 1 and second enclosure 2 are opened, display unit 4 can be formed continuously across first enclosure 1 and second enclosure 2, and moreover, because there is no visible difference in depth of display unit 4 of first enclosure 1 and second enclosure 2, a large quantity of information that is easily visible can be displayed.

Further, in the case of the arrangement of FIG. 1 and FIG. 2, operation input unit 5 can be formed continuously across first enclosure 1 and second enclosure 2 when first enclosure 1 and second enclosure 2 are opened, whereby the area of operation input unit 5 is enlarged. As a result, it becomes possible to increase the number of keys for more complex operations, to decrease the number of menu levels to make input more efficient and improve intuitive operability, and to increase the size of each individual key. As a result, occurrences of mistaken operation can be decreased and ease of use improved.

In addition, in the case of the arrangement of FIG. 1 and FIG. 2, either first enclosure 1 or second enclosure 2 can be used alone as a mobile terminal device when first enclosure 1 and second enclosure 2 are closed. As a result, the mobile terminal device can be used in the two states of being opened and being closed.

(2) Second Exemplary Embodiment

Figure 7:
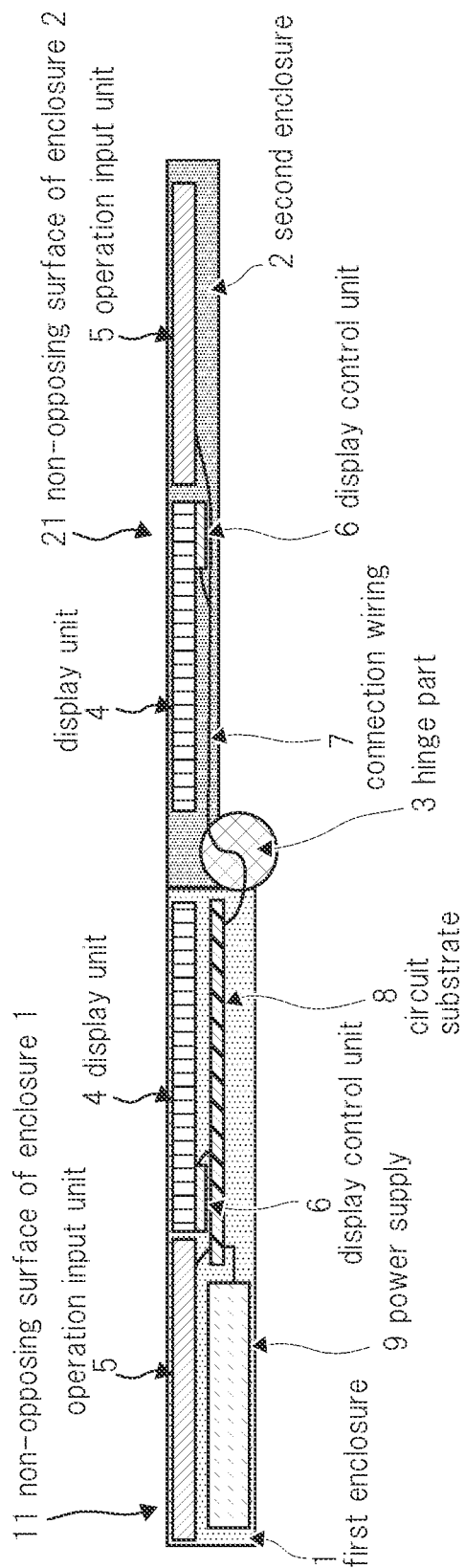
FIG. 7 is a sectional view of the state in which the enclosures of the mobile terminal device of the second exemplary embodiment of the present invention are opened.

FIG. 7 is a sectional view of the mobile terminal device of the second exemplary embodiment of the present invention.

In the first exemplary embodiment, display unit 4 and operation input unit 5 are arranged on first enclosure 1 and second enclosure 2 along the length direction as shown in FIG. 1 and FIG. 2.

In contrast, in the present exemplary embodiment, display unit 4 and operation input unit 5 are arranged along the width direction on first enclosure 1 and second enclosure 2 as shown in FIG. 7.

Here, display control unit 6 that performs display control of display unit 4 is connected to display unit 4. Display control refers to the overall control for bringing about display of information on display unit 4. Circuit substrate 8 on which, for example, a CPU is mounted and power supply 9 such as a battery are arranged in first enclosure 1. Display control unit 6 and operation input unit 5 of each of first enclosure 1 and second enclosure 2 are connected to circuit substrate 8 by means of connection wiring 7, and power supply 9 is also connected to circuit substrate 8. In this case, display control unit 6 and operation input unit 5 of second enclosure 2 are connected to circuit substrate 8 by way of hinge part 3.

Although either first enclosure 1 or second enclosure 2 alone can be used as a mobile terminal device according to the above-described configuration in the present exemplary embodiment, an effect is obtained in which display unit 4 and operation input unit 5 can be used with double the area when first enclosure 1 and second enclosure 2 are opened.

The arrangement of display unit 4 and operation input unit 5 of the present exemplary embodiment and the first exemplary embodiment are only examples, and the present invention is not limited to these arrangements.

For example, display unit 4 and operation input unit 5 are mounted on both first enclosure 1 and second enclosure 2 in the present exemplary embodiment, but the mounting of both of display unit 4 and operation input unit 5 may be realized on first enclosure 1 or second enclosure 2. In other words, display unit 4 or operation input unit 5 may be mounted as an identical device that is common to first enclosure 1 and second enclosure 2, and the effects described above are also obtained in this case.

In addition, although power supply 9 is arranged on only first enclosure 1, and although first enclosure 1 and second enclosure 2 are electrically connected by wiring by means of connection wiring 7 in the present exemplary embodiment, a wireless transmission/reception device may be arranged on each of first enclosure 1 and second enclosure 2 to transmit and receive electric power and signals, or power supply 9 may be arranged on each of first enclosure 1 and second enclosure 2.

Still further, although display unit 4 and operation input unit 5 are arranged independently in the present exemplary embodiment, a touch panel in which display functions and input functions are combined may be used in place of display unit 4 and operation input unit 5.

Finally, in the present exemplary embodiment, any configuration other than described hereinabove is similar to that of the first exemplary embodiment.

(3) Third Exemplary Embodiment

Figure 8:
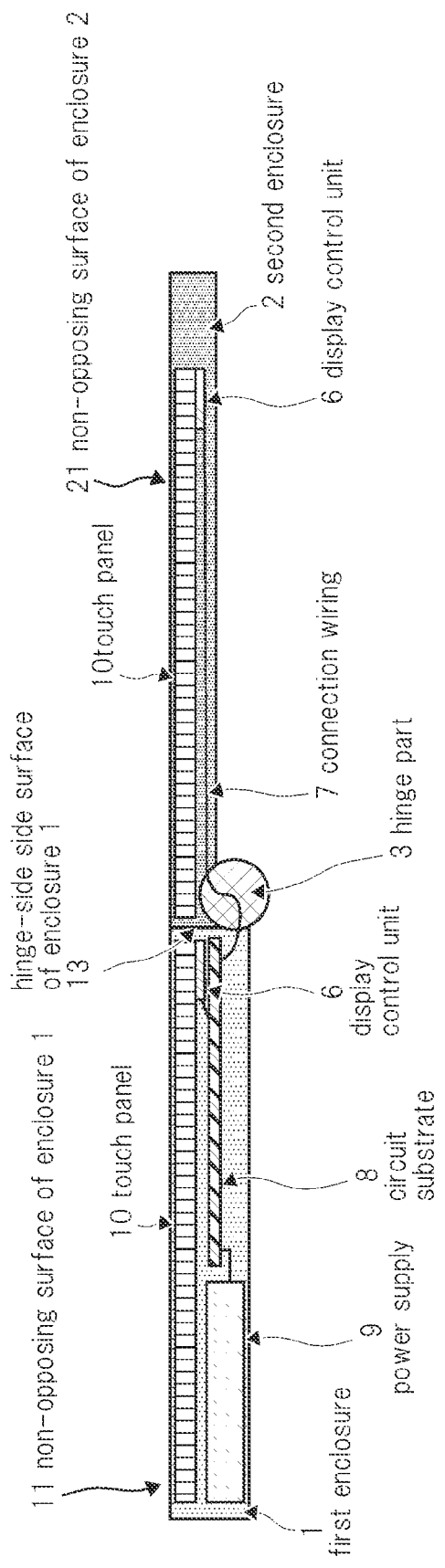
FIG. 8 is a sectional view of the state in which the enclosures of the mobile terminal device of the third exemplary embodiment of the present invention are opened.

FIG. 8 is a sectional view of the mobile terminal device of the third exemplary embodiment of the present invention.

In the second exemplary embodiment, display unit 4 and operation input unit 5 are arranged independently on first enclosure 1 and second enclosure 2 as shown in FIG. 7.

In the present exemplary embodiment, in contrast, touch panel 10 in which display functions and input functions are combined is arranged on first enclosure 1 and second enclosure 2 in place of display unit 4 and operation input unit 5, as shown in FIG. 8.

In addition, in the present exemplary embodiment, hinge part 3 is arranged on the side of second enclosure 2 in the width direction when first enclosure 1 and second enclosure 2 are opened. In second enclosure 2, touch panel 10 is arranged to overlie hinge part 4 in the thickness direction (the direction of non-opposing surface 21 of second enclosure 2). By means of this configuration, touch panel 10 of second enclosure 2 can be brought as close as possible to hinge-side side surface 13 of first enclosure 1. If touch panel 10 of first enclosure 1 is also brought close to the side of second enclosure 2 in this case, the two touch panels 10 can be brought into proximity.

Because two touch panels 10 can be placed in proximity by means of the above-described arrangement in the present exemplary embodiment, a method of use that shows the two screens of first enclosure 1 and second enclosure 2 as a single screen can be realized without any sense of awkwardness. In addition, assuming an operation using touch panels 10 that moves between the two screens, the operation can be realized with ease because the two screens are close to each other without any difference in level or gap between the two screens.

In addition, in second enclosure 2 in the present exemplary embodiment, display control unit 6 that performs display control of touch panel 10 is arranged so as not to overlie hinge part 3 in the thickness direction, and the configuration is therefore advantageous for achieving a thinner construction. The position of arrangement of display control unit 6 may be any position that does not overlie hinge part 3 in the thickness direction, and no particular restriction applies.

Finally, configuration in the present exemplary embodiment other than that described hereinabove is similar to the configuration of the second exemplary embodiment.

(4) Fourth Exemplary Embodiment

Figure 9:
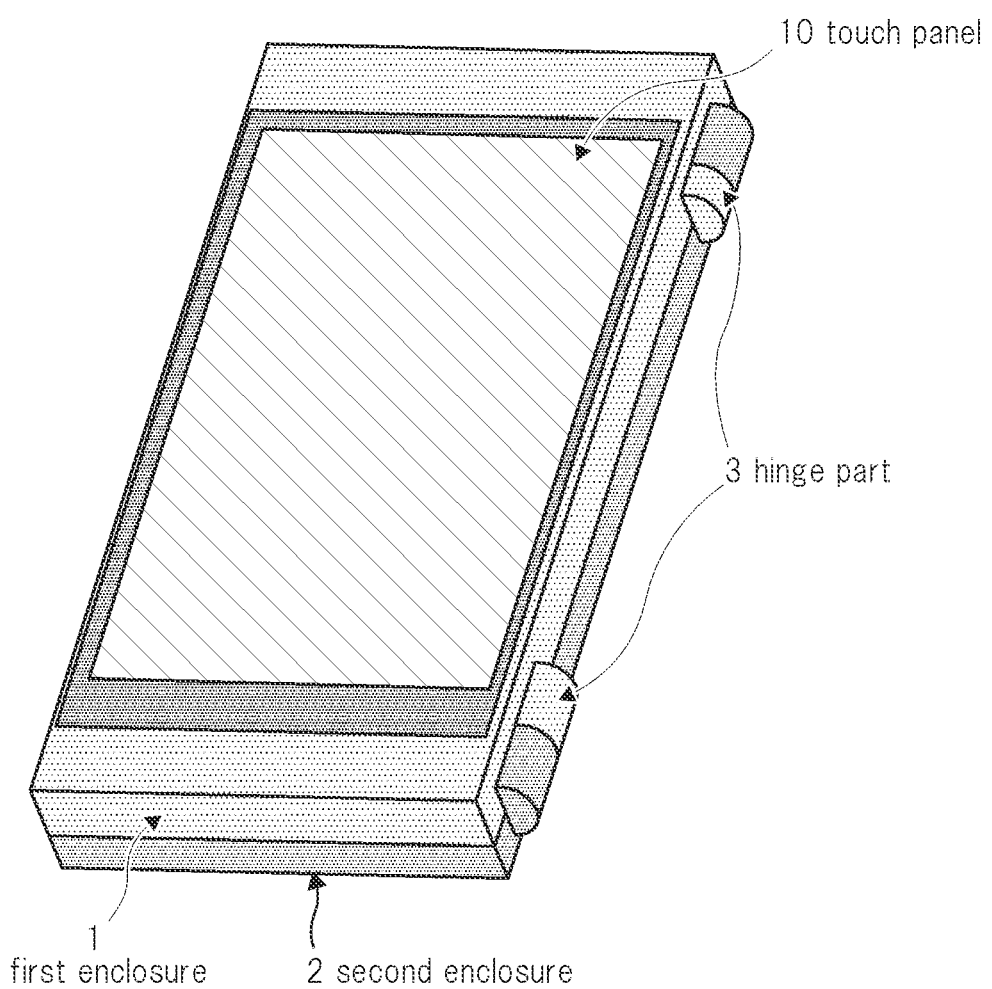
FIG. 9 is a perspective view of the state in which the enclosures of the mobile terminal device of the fourth exemplary embodiment of the present invention are closed.
Figure 10:
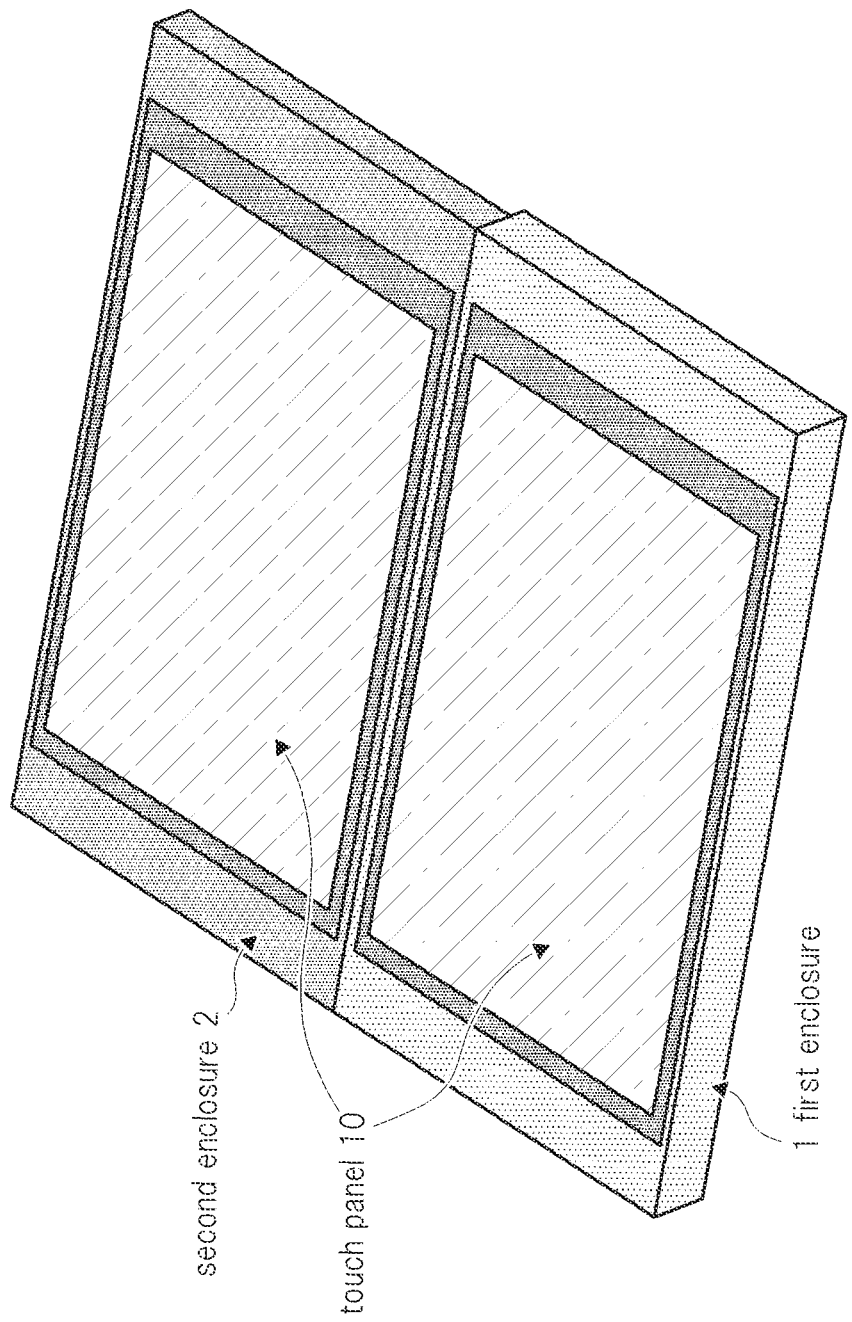
FIG. 10 is a perspective view of the state in which the enclosures of the mobile terminal device of the fourth exemplary embodiment of the present invention are opened.
Figure 11:
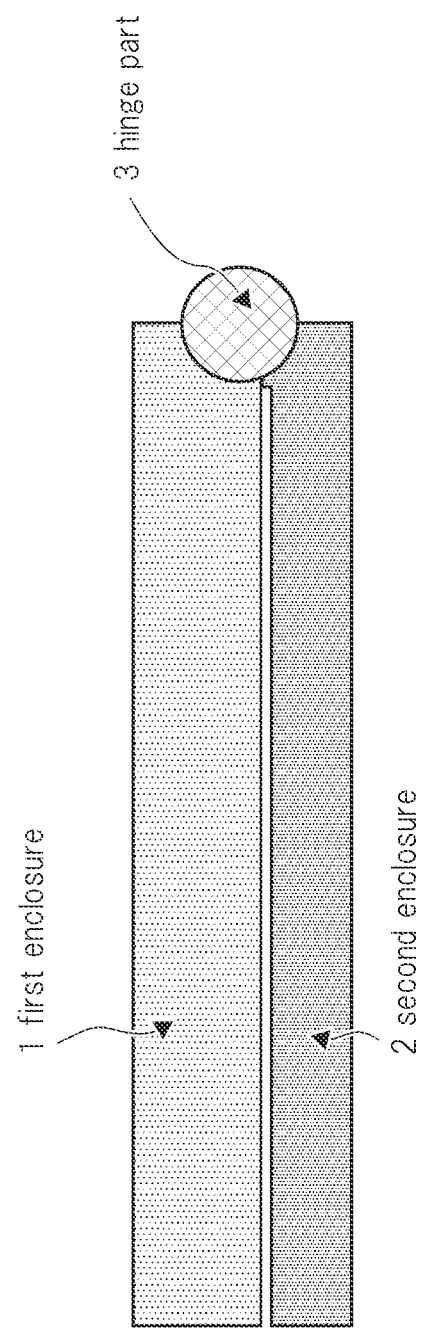
FIG. 11 is a side view of the state in which the enclosures of the mobile terminal device of the fourth exemplary embodiment of the present invention are closed.
Figure 12:
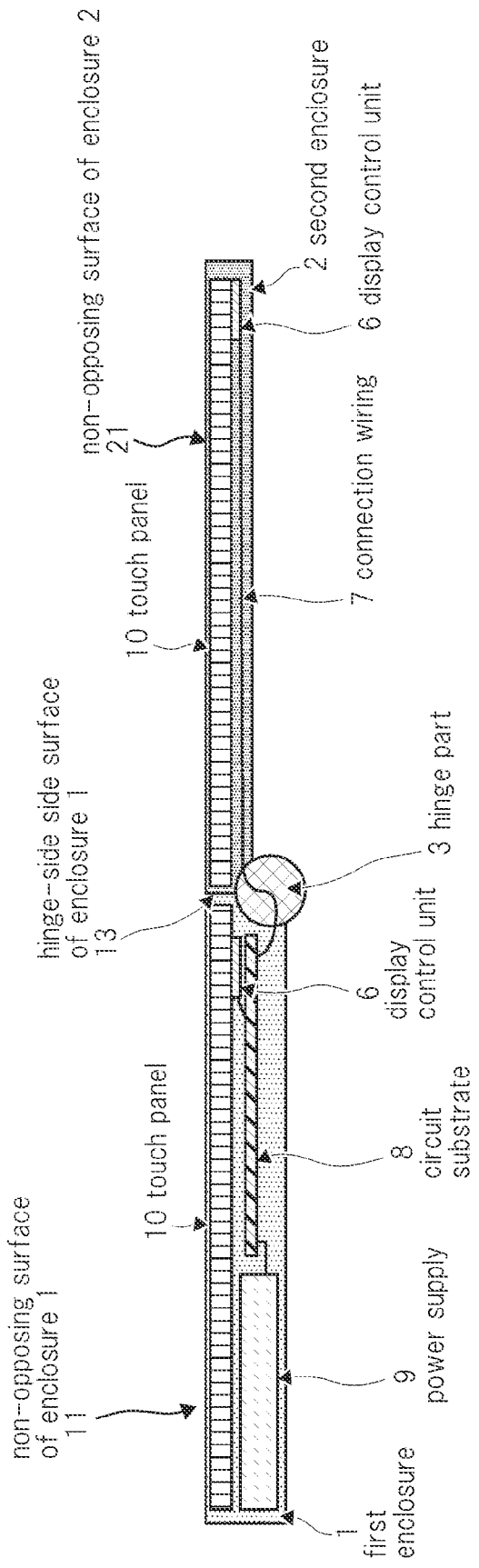
FIG. 12 is a sectional view of the state in which the enclosures of the mobile terminal device of the fourth exemplary embodiment of the present invention are opened.

FIG. 9 and FIG. 10 are perspective views of the mobile terminal device of the fourth exemplary embodiment of the present invention, FIG. 11 is a side view of the mobile terminal device of the fourth exemplary embodiment of the present invention, and FIG. 12 is a sectional view of the mobile terminal device of the fourth exemplary embodiment of the present invention.

In the third exemplary embodiment, because hinge part 3 is arranged on the side of second enclosure 2 in the width direction, when first enclosure 1 and second enclosure 2 are opened as shown in FIG. 8, touch panel 10 is arranged overlying hinge part 3 in the thickness direction only on second enclosure 2.

In the present exemplary embodiment, in contrast, the center of hinge part 3 in the width direction coincides with hinge-side side surfaces 13 and 23 of first enclosure 1 and second enclosure 2 as shown in FIG. 12, and hinge part 3 is arranged to straddle first enclosure 1 and second enclosure 2 in the width direction when first enclosure 1 and second enclosure 2 are opened.

In the present exemplary embodiment, touch panel 10 is arranged to overlie hinge part 3 in the thickness direction on both first enclosure 1 and second enclosure 2, whereby two touch panels 10 can be brought into proximity.

Finally, in the present exemplary embodiment, any configuration other than described hereinabove is similar to the third exemplary embodiment.

(5) Fifth Exemplary Embodiment

Figure 13:
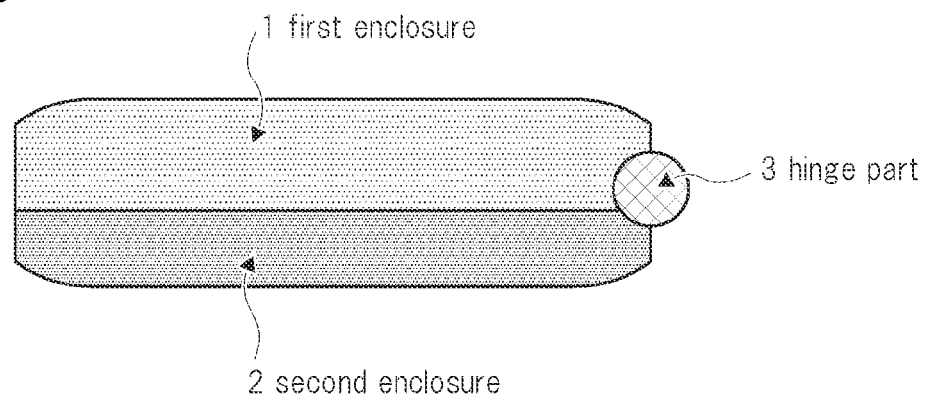
FIG. 13 is a side view of the state in which the enclosures of the mobile terminal device of the fifth exemplary embodiment of the present invention are closed.
Figure 14:
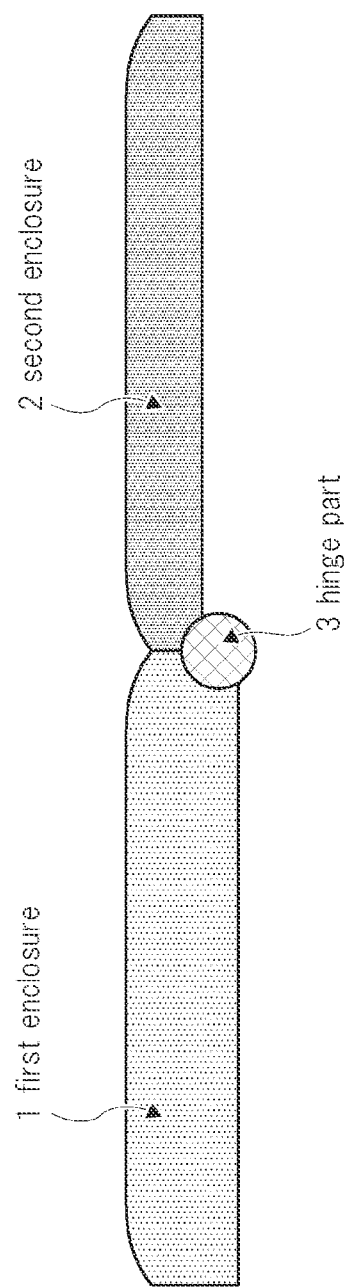
FIG. 14 is a side view of the state in which the enclosures of the mobile terminal device of the fifth exemplary embodiment of the present invention are opened.

FIG. 13 and FIG. 14 are side views of the mobile terminal device of the fifth exemplary embodiment of the present invention.

In the first to fourth exemplary embodiments, the surface that is free of protrusions, differences in levels, or gaps and that is formed on the side of non-opposing surfaces 11 and 21 of first enclosure 1 and second enclosure 2 when first enclosure 1 and second enclosure 2 are opened is a flat surface.

However, the present invention is not limited to this form, and the surface that is formed on the side of non-opposing surfaces 11 and 21 of first enclosure 1 and second enclosure 2 need not be an absolutely flat surface and may be a curved surface or an uneven surface.

In the present exemplary embodiment, the thicknesses of first enclosure 1 and second enclosure 2 gradually decrease toward the ends in the width direction, as shown in FIG. 13 and FIG. 14, and the surface that is formed on the side of non-opposing surfaces 11 and 21 when first enclosure 1 and second enclosure 2 are opened is a curved surface and not an absolutely flat surface.

In this case as well, the problem of the present invention can be solved because protrusions, a difference in level, or a gap in the surface that is formed on the side of non-opposing surfaces 11 and 21 when first enclosure 1 and second enclosure 2 are opened can be eliminated.

Finally, in the present exemplary embodiment, any configuration other than that described hereinabove is similar to any of the first to fourth exemplary embodiments.

(6) Sixth Exemplary Embodiment

Figure 15:
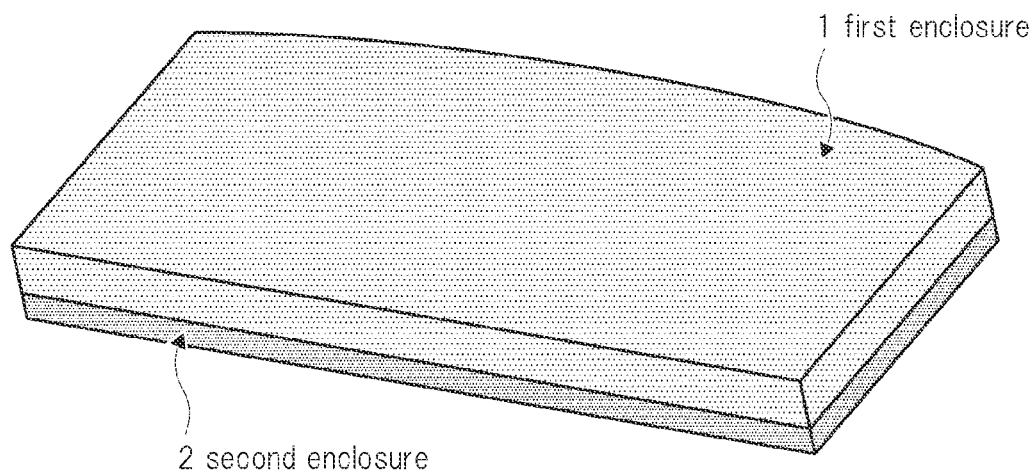
FIG. 15 is a perspective view as seen from the first-enclosure side of the state in which the enclosures of the mobile terminal device of the sixth exemplary embodiment of the present invention are closed.
Figure 16:
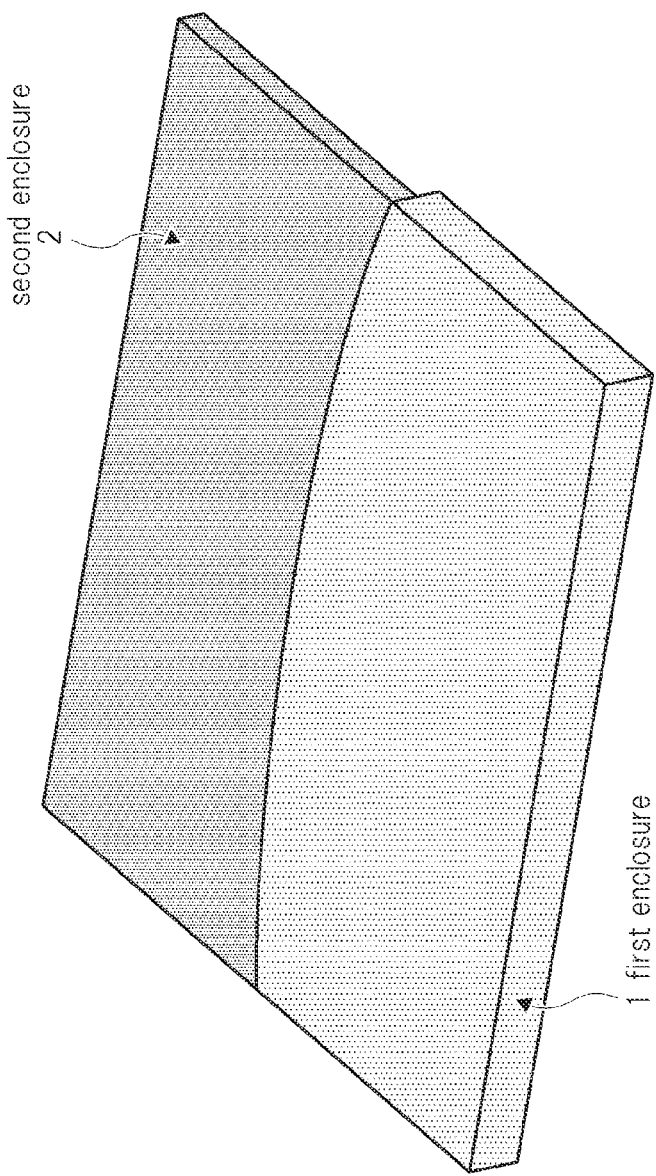
FIG. 16 is a perspective view as seen from the first-enclosure side of the state in which the enclosures of the mobile terminal device of the sixth exemplary embodiment of the present invention are opened.
Figure 17:
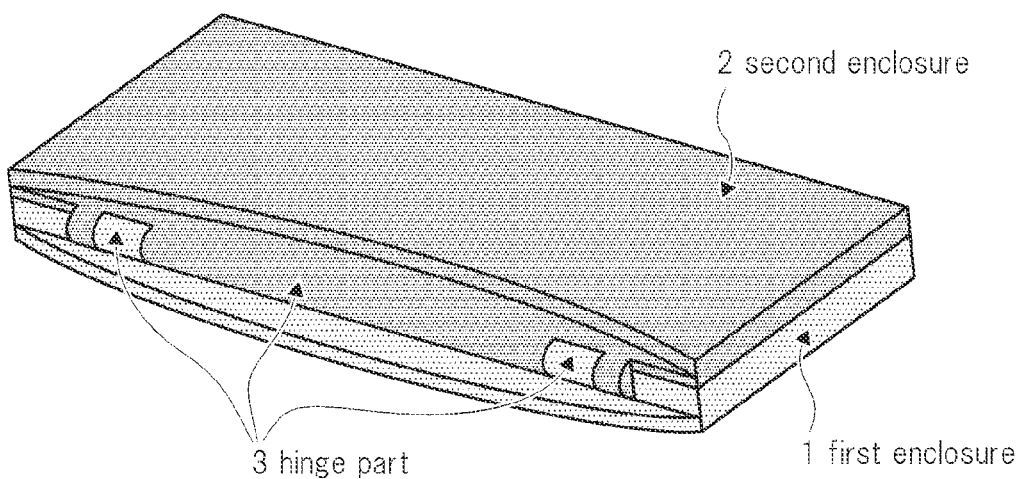
FIG. 17 is a perspective view as seen from the second-enclosure side of the state in which the enclosures of the mobile terminal device of the sixth exemplary embodiment of the present invention are closed.
Figure 18:
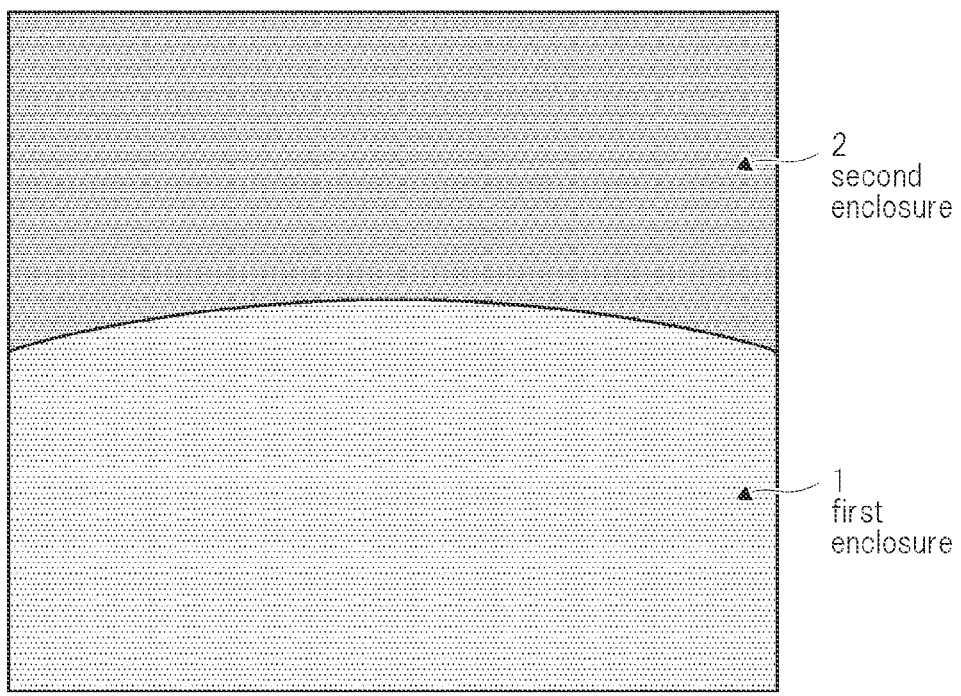
FIG. 18 is a front view of the state in which the enclosures of the mobile terminal device of the sixth exemplary embodiment of the present invention are opened.
Figure 19:
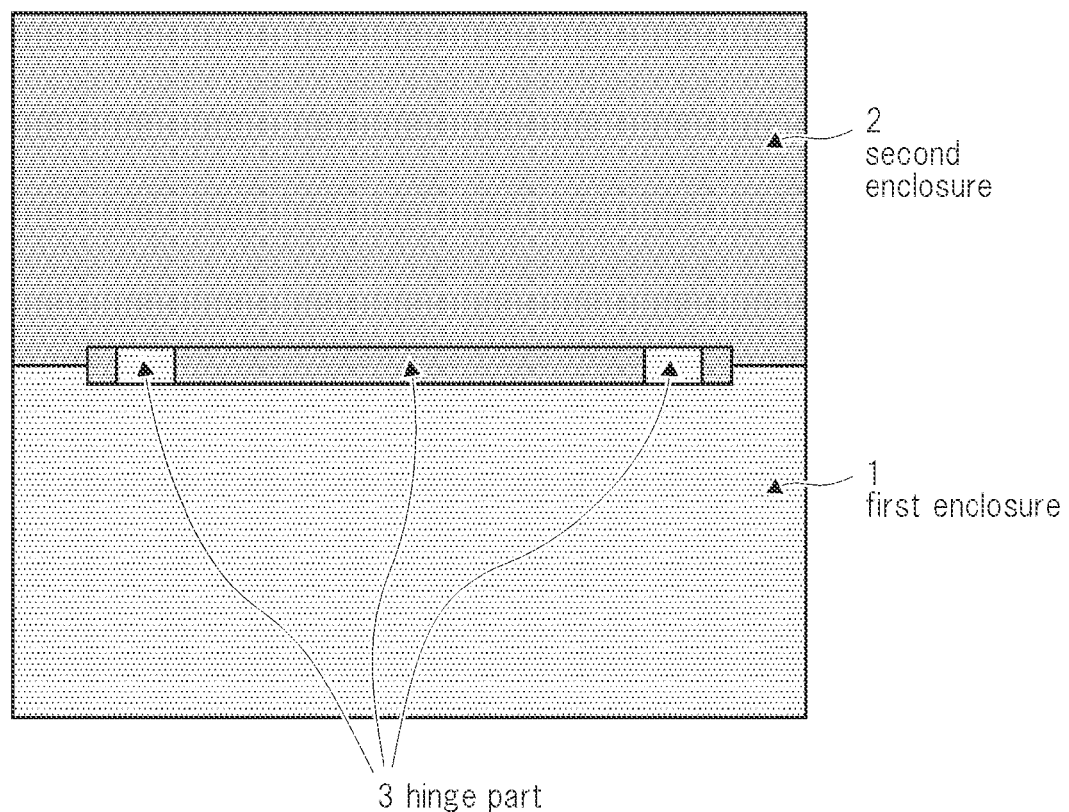
FIG. 19 is a rear view of the state in which the enclosures of the mobile terminal device of the sixth exemplary embodiment of the present invention are opened.

FIGS. 15 to 17 are perspective views of the mobile terminal device of the sixth exemplary embodiment of the present invention, FIG. 18 is a front view of the mobile terminal device of the sixth exemplary embodiment of the present invention, and FIG. 19 is a rear view of the mobile terminal device of the sixth exemplary embodiment of the present invention.

In the first to fifth exemplary embodiments, the shape of the portions at which hinge-side side surfaces 13 and 23 intersect non-opposing surfaces 11 and 21 of first enclosure 1 and second enclosure 2 is linear along the length direction as viewed from the front surface of non-opposing surfaces 11 and 21.

However, the present invention is not limited to this form, and the shapes of the portions at which non-opposing surfaces 11 and 21 intersect hinge-side side surfaces 13 and 23 may assume any form in which the portions at which hinge-side side surfaces 13 and 23 intersect non-opposing surfaces 11 and 21 match when first enclosure 1 and second enclosure 2 are opened.

In the present exemplary embodiment, the shape of the intersecting portions of hinge-side side surfaces 13 and 23 and non-opposing surfaces 11 and 21 of first enclosure 1 and second enclosure 2 is an arc when non-opposing surfaces 11 and 21 are viewed from the front, as shown in FIGS. 15 to 18.

In this case as well, the problem of the present invention can be solved because the intersecting portions of hinge-side side surfaces 13 and 23 and non-opposing surfaces 11 and 21 match when first enclosure 1 and second enclosure 2 are opened, and a gap in the width direction between first enclosure 1 and second enclosure 2 can be eliminated.

Finally, in the present exemplary embodiment, any configuration other than that described hereinabove is similar to any of the first to fifth exemplary embodiments.

(7) Seventh Exemplary Embodiment

Figure 20:
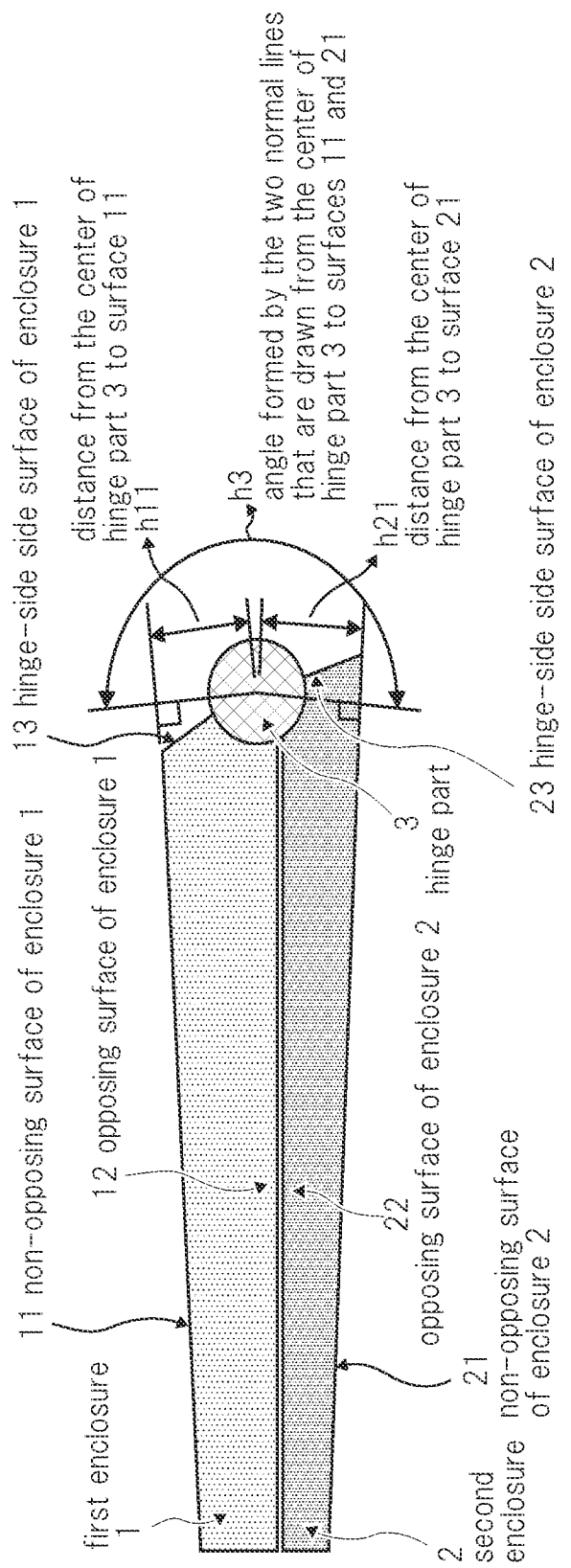
FIG. 20 is a side view of the state in which the enclosures of the mobile terminal device of the seventh exemplary embodiment of the present invention are closed.
Figure 21:
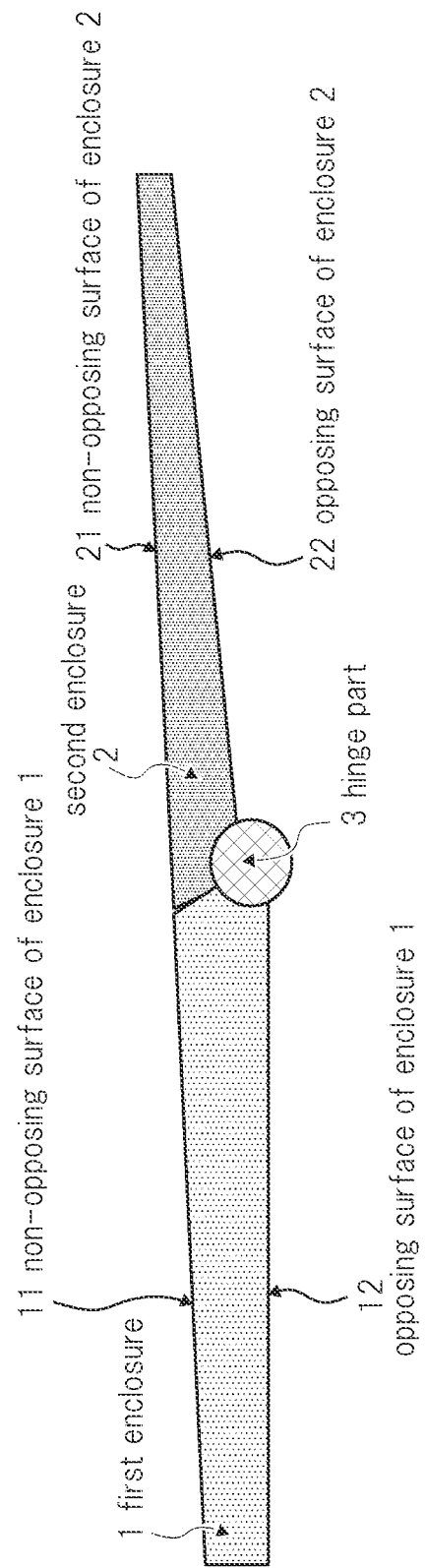
FIG. 21 is a side view of the state in which the enclosures of the mobile terminal device of the seventh exemplary embodiment of the present invention are opened.

FIG. 20 and FIG. 21 are side views of the mobile terminal device of the seventh exemplary embodiment of the present invention.

In the first to fourth exemplary embodiments, opposing surfaces 12 and 22 and non-opposing surfaces 11 and 21 are mutually parallel on both first enclosure 1 and second enclosure 2, and moreover, hinge-side side surfaces 13 and 23 are perpendicular surfaces with respect to opposing surfaces 12 and 22 and non-opposing surfaces 11 and 21.

However, the present invention is not limited to this form, and when opposing surfaces 12 and 22 and non-opposing surfaces 11 and 21 on first enclosure 1 and second enclosure 2 are inclined and not mutually parallel, this degree of inclination may be compensated for by the degree of rotation. In addition, when hinge-side side surfaces 13 and 23 are not perpendicular surfaces with respect to opposing surfaces 12 and 22 and non-opposing surfaces 11 and 21, the inclination may be compensated for by the shape of the hinge-side side surfaces.

In the present exemplary embodiment, opposing surfaces 12 and 22 and non-opposing surfaces 11 and 21 on first enclosure 1 and second enclosure 2 are not mutually parallel, as shown in FIG. 20 and FIG. 21. In addition, hinge-side side surfaces 13 and 23 are not perpendicular surfaces with respect to opposing surfaces 12 and 22 and non-opposing surfaces 11 and 21.

In this case as well, regarding the thickness direction, the distances h11 and h21 from the center of hinge part 3 to non-opposing surfaces 11 and 21 of first enclosure 1 and second enclosure 2 are first made equal, as shown in FIG. 20. Here, distance h11 from the center of hinge part 3 to non-opposing surface 11 of first enclosure 1 is the length of the normal line drawn from the center of hinge part 3 to non-opposing surface 11 of first enclosure 1, and distance h21 from the center of hinge part 3 to non-opposing surface 21 of second enclosure 2 is the length of the normal line drawn from the center of hinge part 3 to non-opposing surface 21 of second enclosure 2.

By means of this configuration, the occurrence of a difference in levels between first enclosure 1 and second enclosure 2 can be avoided on the side of non-opposing surfaces 11 and 21 when first enclosure 1 and second enclosure 2 are opened, as shown in FIG. 21.

Still further, regarding the thickness direction, the diameter of hinge part 3 is made equal to or less than the total thickness t of the mobile terminal device, as shown in FIG. 20. Here, total thickness t refers to the total length of distances h11 and h21 from the center of hinge part 3 to non-opposing surfaces 11 and 21 of first enclosure 1 and second enclosure 2, respectively.

By means of this configuration, the formation of a protrusion by hinge part 3 on the side of non-opposing surfaces 11 and 21 can be avoided when first enclosure 1 and second enclosure 2 are opened, as shown in FIG. 21.

Next, regarding the width direction, hinge-side side surfaces 13 and 23 of first enclosure 1 and second enclosure 2 are made to match when first enclosure 1 and second enclosure 2 that are in the closed state as shown in FIG. 20 are rotated a predetermined angle h3. Here, the matching of hinge-side side surfaces 13 and 23 refers to the contact or proximity of hinge-side side surfaces 13 and 23. The predetermined angle h3 refers to the angle formed by the two normal lines that are drawn from the center of hinge part 3 to non-opposing surfaces 11 and 21 of each of first enclosure 1 and second enclosure 2, respectively.

By means of this configuration, first enclosure 1 and second enclosure 2 can be placed in adjacency without a gap in the width direction on the side of non-opposing surfaces 11 and 21 when first enclosure 1 and second enclosure 2 are opened, as shown in FIG. 21.

Hinge-side side surfaces 13 and 23 need not absolutely match, but in order to bring first enclosure 1 and second enclosure 2 into adjacency without a gap, the portions at which hinge-side side surface 13 intersects non-opposing surface 11 and the portion at which hinge-side side surface 23 intersects non-opposing surface 21 should match.

By means of the above-described construction, a surface that is free of a protrusion, difference in level, or gap can be formed on the side of non-opposing surfaces 11 and 21 when first enclosure 1 and second enclosure 2 in the present exemplary embodiment are opened, as shown in FIG. 21.

Finally, in the present exemplary embodiment, any configuration other than that described hereinabove is similar to any of the first to fourth exemplary embodiments.

(8) Eighth Exemplary Embodiment

Figure 22:
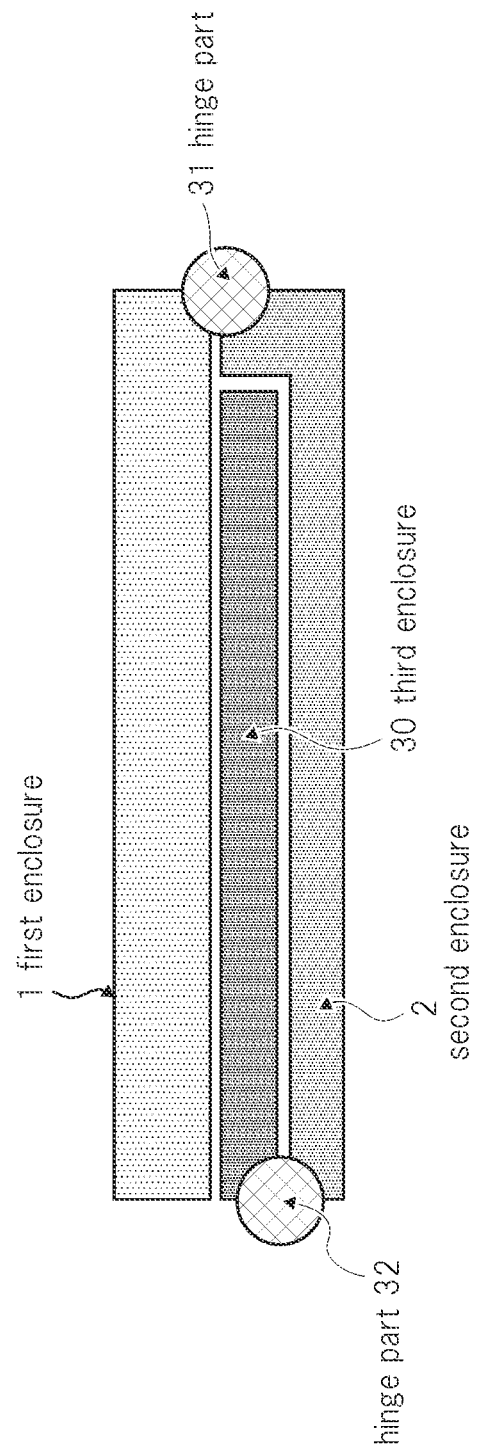
FIG. 22 is a side view of the state in which the enclosures of the mobile terminal device of the eighth exemplary embodiment of the present invention are closed.
Figure 23:
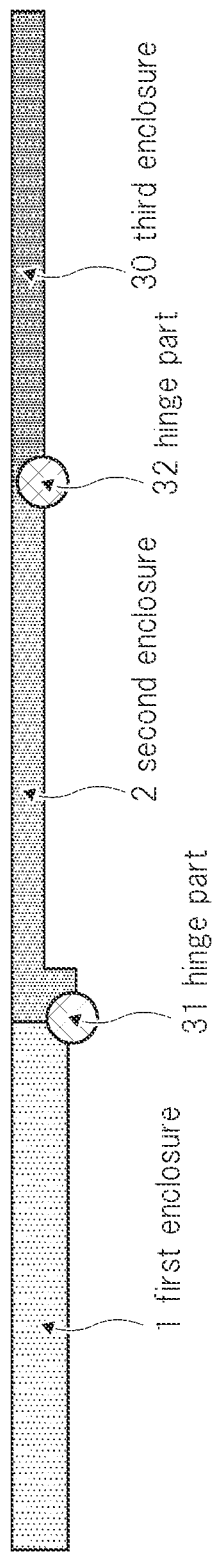
FIG. 23 is a side view of the state in which the enclosures of the mobile terminal device of the eighth exemplary embodiment of the present invention are opened.

FIG. 22 and FIG. 23 are side views of the mobile terminal device of the eighth exemplary embodiment of the present invention.

In the first to seventh exemplary embodiments, the mobile terminal device was configured from two enclosures (first enclosure 1 and second enclosure 2), but the present invention is not limited to this form.

In the present exemplary embodiment, the mobile terminal device has a configuration made up of three enclosures (first enclosure 1, second enclosure 2, and third enclosure 30), as shown in FIG. 22 and FIG. 23.

First enclosure 1 and second enclosure 2 are openably and closably connected by means of hinge part 31, and second enclosure 2 and third enclosure 30 are openably and closably connected by means of hinge part 32.

When the three enclosures are opened, first enclosure 1 and second enclosure 2 are first unfolded, following which second enclosure 2 and third enclosure 30 are unfolded.

In the present exemplary embodiment, the relationship between first enclosure 1 and second enclosure 2 that are connected by hinge part 31 and the relationship between second enclosure 2 and third enclosure 30 that are connected by hinge part 32 are similar to the relationship between first enclosure 1 and second enclosure 2 in any of the first to seventh exemplary embodiments.

(9) Ninth Exemplary Embodiment

Figure 24:
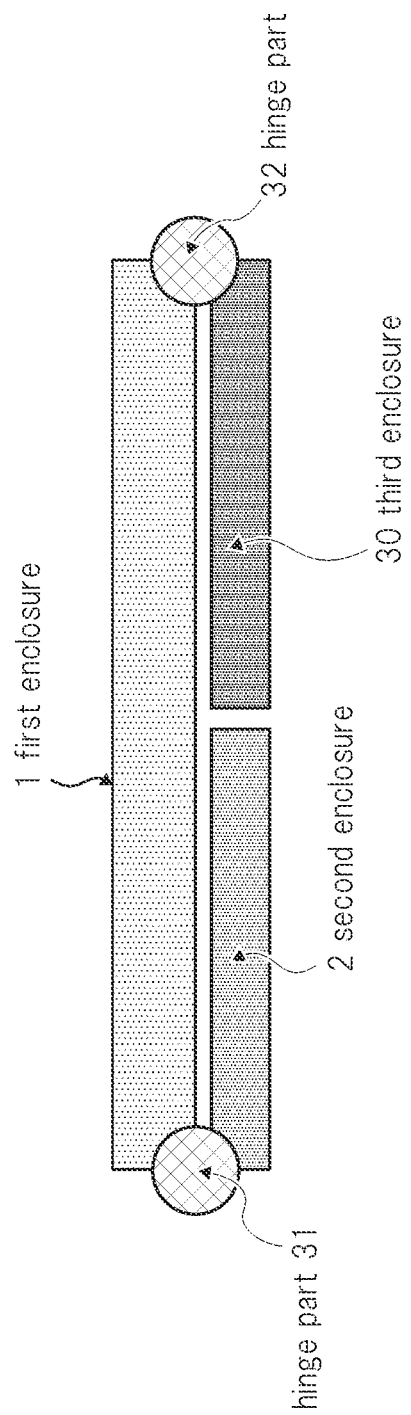
FIG. 24 is a side view of the state in which the enclosures of the mobile terminal device of the ninth exemplary embodiment of the present invention are closed.
Figure 25:
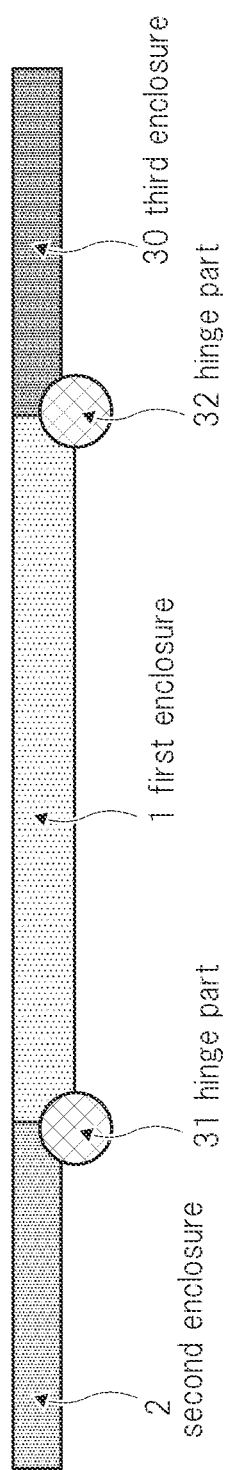
FIG. 25 is a side view of the state in which the enclosures of the mobile terminal device of the ninth exemplary embodiment of the present invention are opened.
Figure 26:
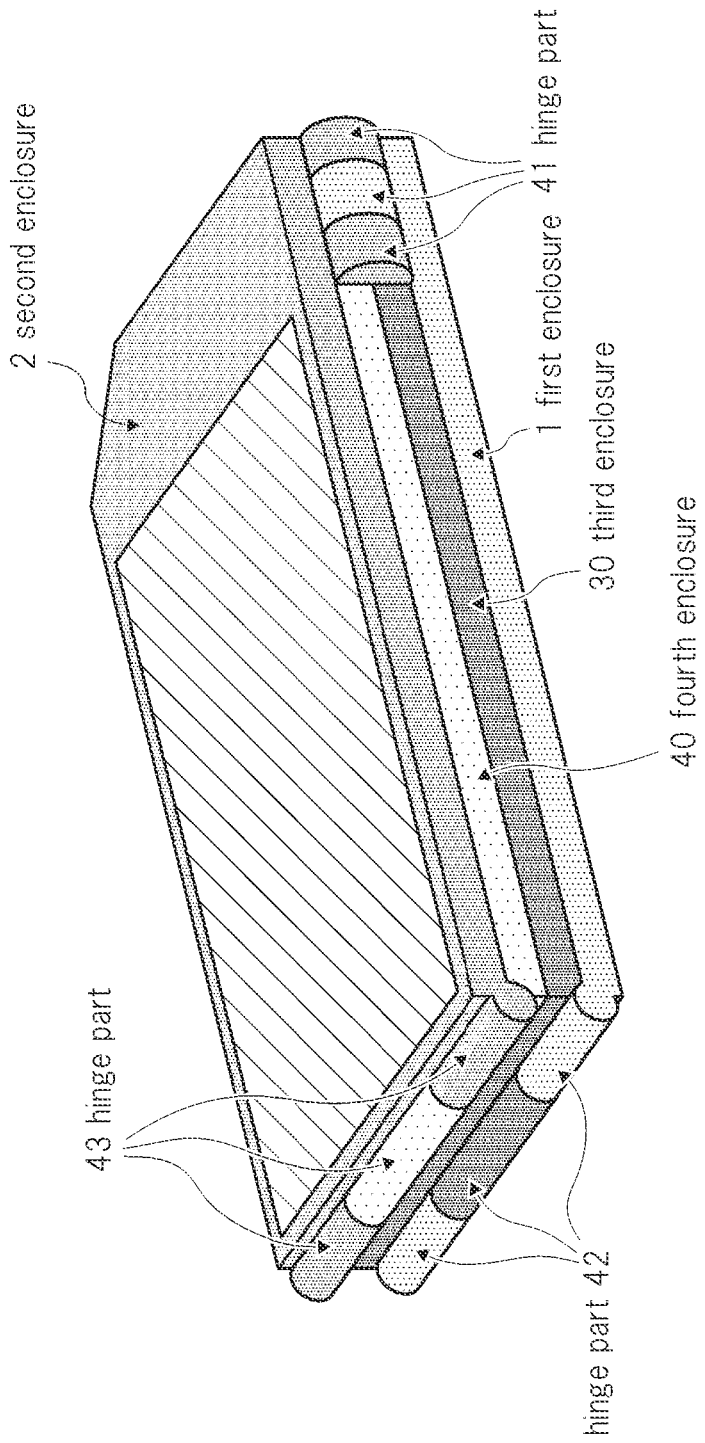
FIG. 26 is a perspective view of the state in which the enclosures of the mobile terminal device of the tenth exemplary embodiment of the present invention are closed.

FIG. 24 and FIG. 25 are side views of the mobile terminal device of the ninth exemplary embodiment of the present invention.

In the eighth exemplary embodiment, the mobile terminal device had a configuration in which each enclosure was successively unfolded when the three enclosures (first enclosure 1, second enclosure 2, and third enclosure 6) were opened.

In the present exemplary embodiment, in contrast, the mobile terminal device has a configuration in which second enclosure 2 and third enclosure 6 open out from first enclosure 1 similar to French doors when the three enclosures are opened, as shown in FIG. 24 and FIG. 25.

In the present exemplary embodiment, any configuration other than that described above is similar to that of the eighth exemplary embodiment.

(10) Tenth Exemplary Embodiment

FIGS. 26-30 are perspective views of the mobile terminal device of the tenth exemplary embodiment of the present invention.

Although the mobile terminal devices in the eighth and ninth exemplary embodiments had a construction made up of three enclosures (first enclosure 1, second enclosure 2, and third enclosure 6), the mobile terminal device of the present exemplary embodiment has a configuration made up of four enclosures (first enclosure 1, second enclosure 2, third enclosure 30, and fourth enclosure 40) as shown in FIGS. 26-30.

In addition, in contrast to the single direction of unfolding when opening the enclosures in the eighth and ninth exemplary embodiments, the mobile terminal device in the present exemplary embodiment has a configuration in which enclosures are unfolded in two directions when the enclosures are opened, as shown in FIGS. 26 to 30.

First enclosure 1 and second enclosure 2 are openably and closably connected by means of hinge part 41, first enclosure 1 and third enclosure 30 are openably and closably connected by means of hinge part 42, and second enclosure 2 and fourth enclosure 40 are openably and closably connected by means of hinge part 43.

Figure 27:
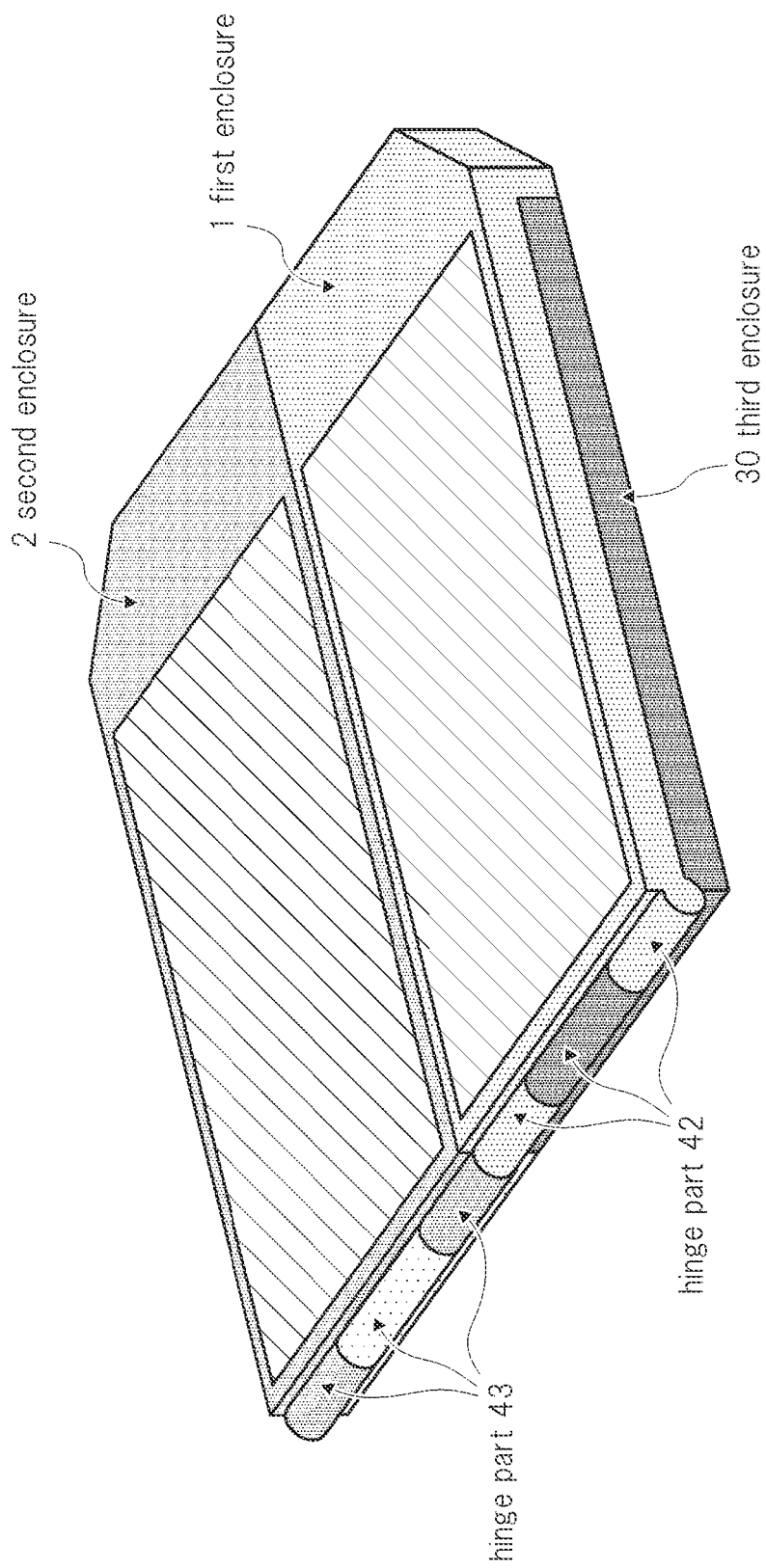
FIG. 27 is a perspective view of the state in which the enclosures of the mobile terminal device of the tenth exemplary embodiment of the present invention are opened as far as a first stage.
Figure 28:
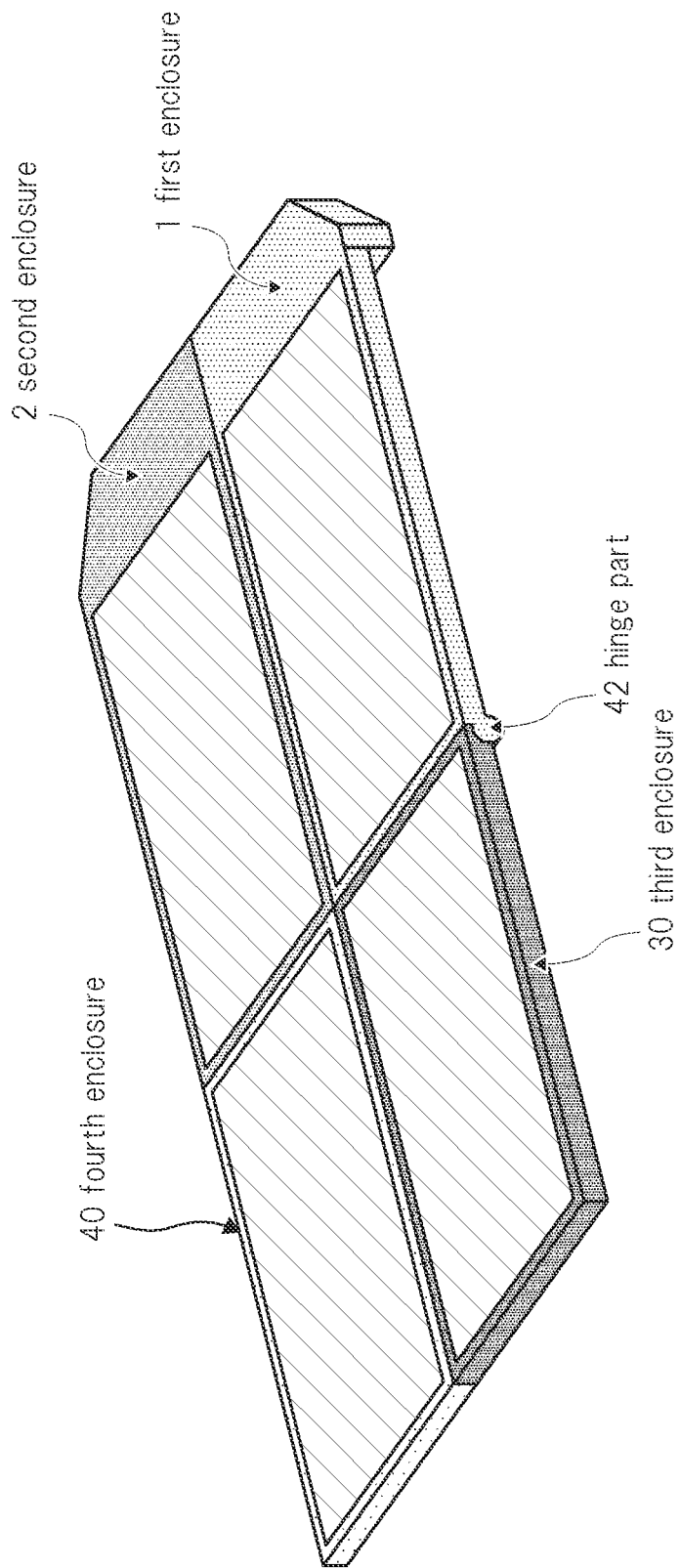
FIG. 28 is a perspective view as seen from the front of the state in which the enclosures of the mobile terminal device of the tenth exemplary embodiment of the present invention are opened as far as the final stage.
Figure 29:
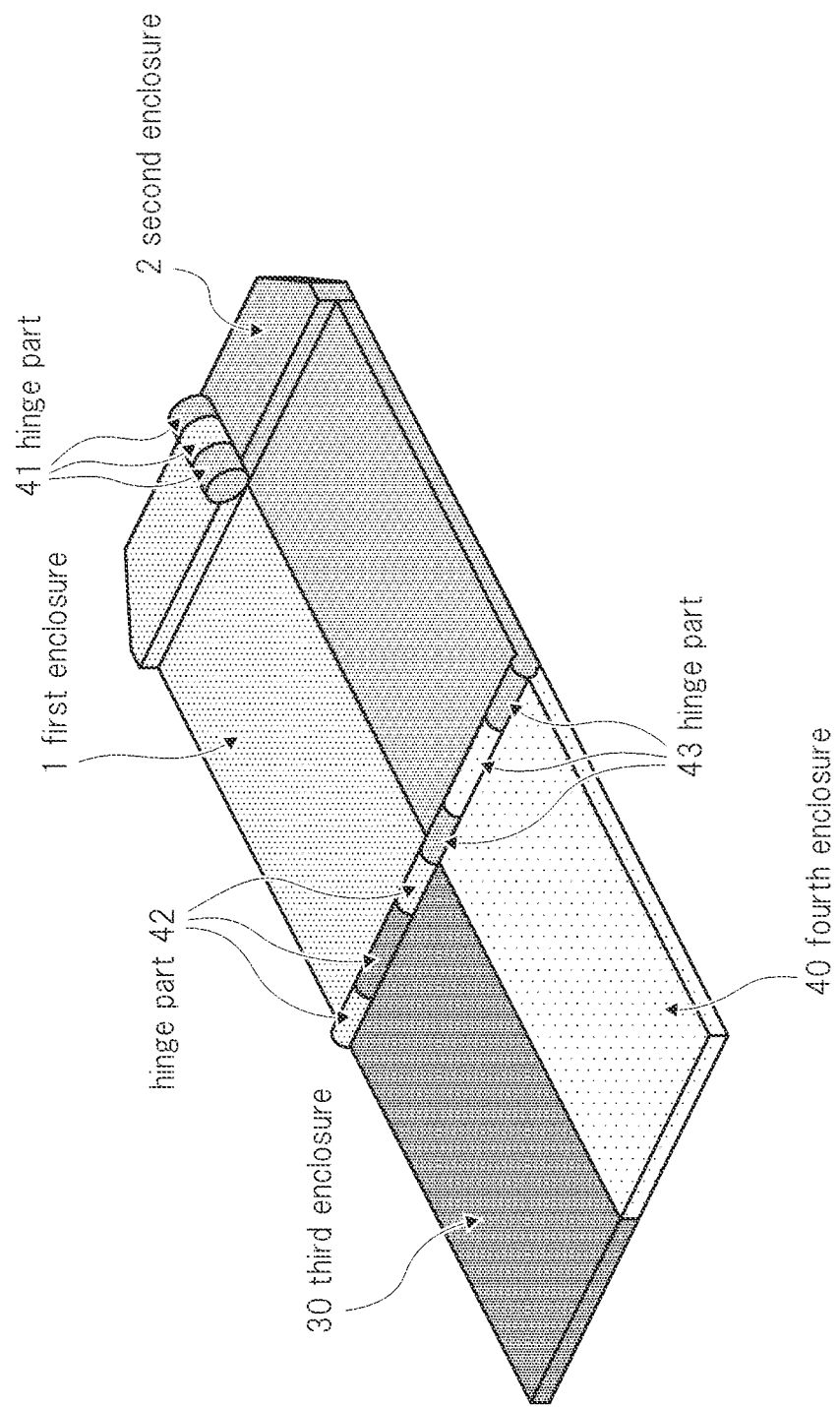
FIG. 29 is a perspective view as seen from the rear of the state in which the enclosures of the mobile terminal device of the tenth exemplary embodiment of the present invention are opened as far as the final stage.

When the four enclosures that are in the closed state (FIG. 26) are opened, first enclosure 1 and second enclosure 2 are first unfolded as shown in FIG. 27 (first stage). Next, not only first enclosure 1 and third enclosure 30, but second enclosure 2 and fourth enclosure 40 are also unfolded in a direction that is orthogonal to the direction of unfolding of first enclosure 1 and second enclosure 2, as shown in FIG. 28 and FIG. 29 (final stage).

Figure 30:
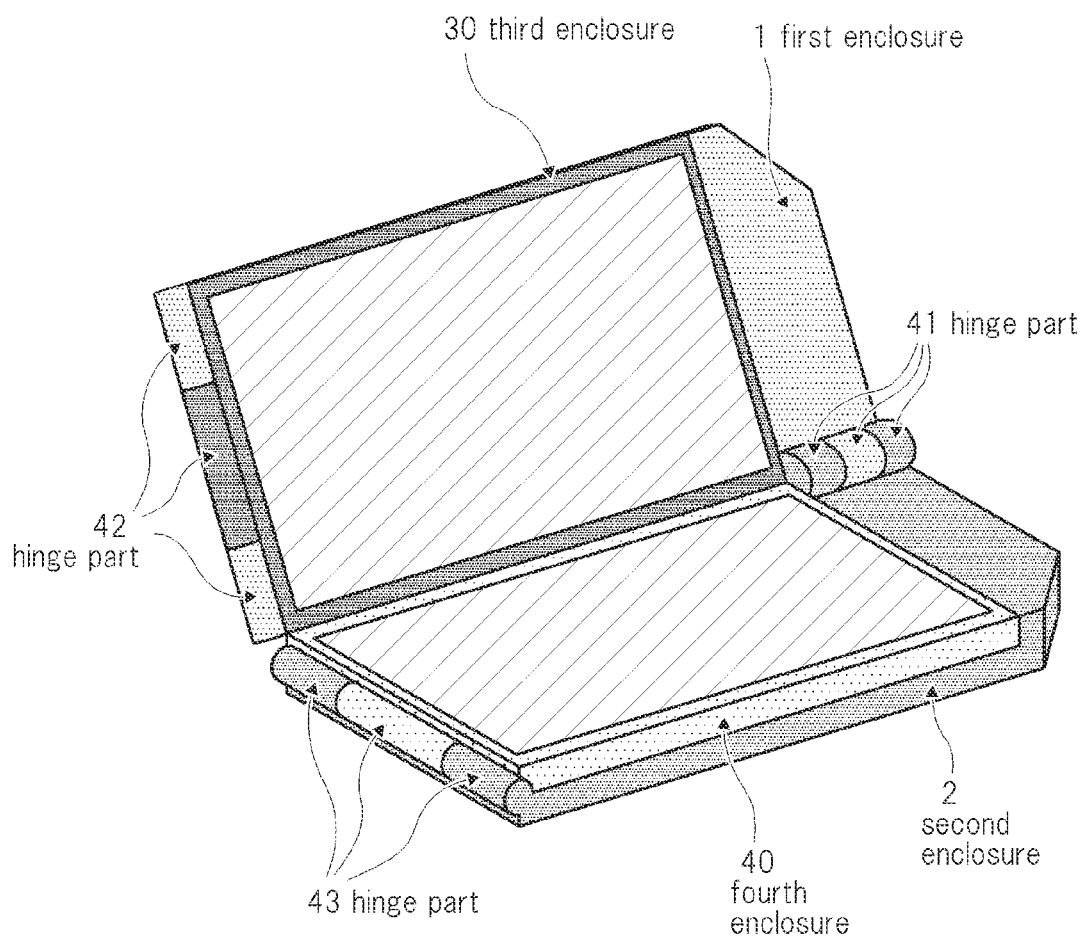
FIG. 30 is a perspective view of the state in which the enclosures of the mobile terminal device of the tenth exemplary embodiment of the present invention are in the process of opening as far as the first stage.

In the process of unfolding first enclosure 1 and second enclosure 2, the mobile terminal device of the present exemplary embodiment can be used similarly to a folding personal computer, as shown in FIG. 30.

In the present exemplary embodiment, the relationship between first enclosure 1 and second enclosure 2 that are connected by means of hinge part 41, the relationship between first enclosure 1 and third enclosure 30 that are connected by means of hinge part 42, and the relationship between second enclosure 2 and fourth enclosure 40 that are connected by means of hinge part 43 are similar to the relationship between first enclosure 1 and second enclosure 2 of any of the first to seventh exemplary embodiments.

Although the present invention has been described with reference to exemplary embodiments, the present invention is not limited to the above-described exemplary embodiments. The configuration and details of the present invention are open to various modifications within the scope of the present invention that will be clear to one of ordinary skill in the art.

For example, although examples have been described in the above-described exemplary embodiments in which the number of enclosures was two, three, or four, the number of enclosures is not limited to these numbers and may be any number of enclosures. In such cases, the relationship between two enclosures that are connected by means of a hinge part should be a relationship similar to that of first enclosure 1 and second enclosure 2 of any of the first to seventh exemplary embodiments.

In the third and fourth exemplary embodiments, examples were described in which two touch panels 10 are brought into proximity, but the present invention is not limited to this form, and when two display units 4 or operation input units 5 are brought into proximity, display units 4 or operation input units 5 may be arranged to overlie hinge part 3 in the thickness direction.

In the third exemplary embodiment, an example of the arrangement of display control unit 6 was described for a case in which touch panel 10 is mounted, but when display unit 4 is mounted in place of touch panel 10, display control unit 6 may be similarly arranged.

Regarding the operation of opening and closing enclosures in the present invention, the user may open and close the enclosures by directly moving the enclosures, or a mechanism may be provided that automatically opens the enclosures when a button is pushed.

It is assumed in the present invention that an operation is carried out when the enclosures are in the opened state, and the hinge part should therefore not rotate with the enclosures in the opened state.

As a result, a mechanism may be provided that intentionally changes the holding torque of the hinge part in the opened state and in the closed state so that the enclosures do not easily close when the enclosures are in the opened state. Alternatively, a mechanism may be provided that applies a lock when the enclosures transition from the closed state to the opened state and that does not release locked state until a predetermined operation such as pressing a button is carried out.

What is claimed is:

1. A mobile terminal device comprising:
    at least one hinge part; and
    a first enclosure and a second enclosure that are openably and closably connected by way of said hinge part;
    wherein:
    where, in said first enclosure and said second enclosure, surfaces that face the other enclosure in the closed state are opposing surfaces and surfaces that are on the reverse sides of said opposing surfaces are non-opposing surfaces:
    distances between the center of said hinge part and said non-opposing surfaces of each of said first enclosure and said second enclosure are equal;
    when said first enclosure and said second enclosure that are in the closed state are rotated by the angle formed by two normal lines drawn from the center of said hinge part to said non-opposing surface of each of said first enclosure and said second enclosure, the portion at which said non-opposing surface of said first enclosure intersects with said hinge-side side surface matches the portion at which said non-opposing surface of said second enclosure intersects said hinge-side side surface; and
    the diameter of said hinge part is no greater than the total length of the distances between the center of said hinge part and said non-opposing surface of each of said first enclosure and said second enclosure.

2. The mobile terminal device as set forth in claim 1, wherein identical devices are mounted on said non-opposing surfaces of said first enclosure and said second enclosure.

3. The mobile terminal device as set forth in claim 2, wherein, on at least one of said first enclosure and said second enclosure, said device is arranged to overlie said hinge part in the direction of said non-opposing surface.

4. The mobile terminal device as set forth in claim 2, wherein said device is a display unit.

5. The mobile terminal device as set forth in claim 4, wherein:
    a display control unit that performs display control of said display unit or said touch panel is mounted in said first enclosure and said second enclosure; and
    in said first enclosure and said second enclosure, said display control unit is arranged in positions that do not overlie said hinge part in the thickness direction of said mobile terminal device.

6. The mobile terminal device as set forth in claim 2, wherein said device is a display unit and an operation input unit.

7. The mobile terminal device as set forth in claim 2, wherein said device is a touch panel.

8. The mobile terminal device as set forth in claim 2, wherein said device is an operation input unit.

* * * * *